US012668491B2

(12) United States Patent (10) Patent No.: US 12,668,491 B2
Kang et al. (45) Date of Patent: Jun. 30, 2026

(54) COMPOSITE GRAPHITE MATERIAL, METHOD FOR PREPARING SAME, NEGATIVE ELECTRODE SHEET, SECONDARY BATTERY, BATTERY MODULE, BATTERY PACK, AND ELECTRICAL APPARATUS

(71) Applicant: CONTEMPORARY AMPEREX TECHNOLOGY (HONG KONG) LIMITED, Hong Kong (CN)

(72) Inventors: Meng Kang, Ningde City (CN); Libing He, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 64 days.

(21) Appl. No.: 18/466,006

(22) Filed: Sep. 13, 2023

(65) Prior Publication Data

US 2023/0416097 A1 Dec. 28, 2023

Related U.S. Application Data

(63) Continuation of application No. PCT/CN2022/093671, filed on May 18, 2022.

(30) Foreign Application Priority Data

Sep. 15, 2021 (CN) .......................... 202111079771.0

(51) Int. Cl.
  *C01B 32/21* (2017.01)
  *C01B 32/205* (2017.01)
(52) U.S. Cl.
  CPC ............ *C01B 32/21* (2017.08); *C01B 32/205* (2017.08); *C01P 2004/61* (2013.01); *C01P 2006/10* (2013.01); *C01P 2006/40* (2013.01)

(58) Field of Classification Search
  CPC ....... C01B 32/21; C01B 32/205; C01B 32/05; C01B 32/20; C01B 32/225; C01B 32/23;
  (Continued)

(56) References Cited

U.S. PATENT DOCUMENTS

2002/0015888 A1* 2/2002 Omaru .................. H01M 4/366
                                                          429/231.1
2021/0126248 A1 4/2021 Choi et al.

FOREIGN PATENT DOCUMENTS

CN        1702893 A   11/2005
CN    104140098 B    4/2016
        (Continued)

OTHER PUBLICATIONS

The First Office Action received in the counterpart Chinese application 202111079771.0, mailed on Apr. 9, 2024.
(Continued)

*Primary Examiner* — Daniel S Gatewood
(74) *Attorney, Agent, or Firm* — K&L Gates LLP

(57) ABSTRACT

Disclosed are a composite graphite material, a method for preparing the same, a negative electrode sheet, a secondary battery, a battery module, a battery pack, and an electrical apparatus. The composite graphite material comprises a bulk particle and a cladding layer located on at least a partial surface of the bulk particle, the bulk particle is a secondary particle formed by aggregation of more than two primary particles, the bulk particle comprises artificial graphite, the cladding layer comprises amorphous carbon, and an air oxidation temperature $T_0$ of the composite graphite material is from 630° C. to 730° C. The composite graphite material in the present application can enable the secondary battery to not only have a high energy density, but also have significantly improved fast charging performance and low-temperature power performance.

14 Claims, 4 Drawing Sheets

(58) Field of Classification Search
CPC ............. C01P 2004/61; C01P 2006/10; C01P 2006/40; H01M 4/133; H01M 4/366; H01M 4/587; H01M 10/0525; H01M 4/625; H01M 10/05; H01M 2004/021; H01M 2004/027; H01M 2220/20; H01M 4/1393; H01M 4/583; H01M 4/62; H01M 2220/10; H01M 2220/30; Y02E 60/10
See application file for complete search history.

(56) References Cited

FOREIGN PATENT DOCUMENTS

| | | | | | |
|---|---|---|---|---|---|
| CN | 105789627 | A | * | 7/2016 | ........ H01M 10/0525 |
| CN | 106486641 | A | | 3/2017 | |
| CN | 107195891 | A | | 9/2017 | |
| CN | 109748587 | A | | 5/2019 | |
| CN | 111620332 | A | * | 9/2020 | .......... C01B 32/205 |
| CN | 110620236 | B | | 6/2021 | |
| CN | 113207313 | A | | 8/2021 | |
| CN | 113207316 | A | | 8/2021 | |
| EP | 1134827 | A2 | | 9/2001 | |
| JP | 2001332263 | A | | 11/2001 | |
| KR | 1020120004801 | A | | 1/2012 | |
| KR | 1020140085767 | A | | 7/2014 | |
| KR | 1020200085587 | A | | 7/2020 | |
| WO | 2013164914 | A1 | | 11/2013 | |
| WO | 2014178093 | A1 | | 11/2014 | |
| WO | 2018047939 | A1 | | 3/2018 | |
| WO | 2021108982 | A1 | | 6/2021 | |

OTHER PUBLICATIONS

Notice of Reasons for Refusal received in the counterpart Japanese application 2023-530727, mailed on Jun. 11, 2024.

The extended European search report received in the counterpart European application 22868696.0, mailed on May 28, 2024.

The Request for the Submission of an Opinion received in the counterpart Korean application 10-2023-7016302, mailed on Feb. 11, 2025.

The Notice of Allowance received in the counterpart Japanese application 2023-530727, mailed on Dec. 3, 2024.

The international search report received in the corresponding international application PCT/CN2022/093671, mailed Jul. 27, 2022.

The written opinion received in the corresponding international application PCT/CN2022/093671, mailed Jul. 27, 2022.

Notice of Allowance (with English Machine Translation), mailed Nov. 13, 2025, for Chinese Patent Application Serial No. 202411059793.4.

Notice of Allowance (with English Machine Translation), mailed Nov. 17, 2025, for Chinese Patent Application Serial No. 202411059644.8.

* cited by examiner

5

5

COMPOSITE GRAPHITE MATERIAL, METHOD FOR PREPARING SAME, NEGATIVE ELECTRODE SHEET, SECONDARY BATTERY, BATTERY MODULE, BATTERY PACK, AND ELECTRICAL APPARATUS

CROSS-REFERENCE TO RELATED APPLICATIONS

The present application is a continuation of International Application PCT/CN2022/093671, filed on May 18, 2022, which claims priority to Chinese Patent Application No. 202111079771.0 titled "COMPOSITE GRAPHITE MATE-RIAL, METHOD FOR PREPARING SAME, NEGATIVE ELECTRODE SHEET, AND SECONDARY BATTERY" submitted on 15 Sep. 2021, the entire contents of which are incorporated herein by reference.

TECHNICAL FIELD

The present application belongs to the technical field of batteries, and particularly relates to a composite graphite material, a method for preparing the same, a negative electrode sheet, a secondary battery, a battery module, a battery pack, and an electrical apparatus.

BACKGROUND ART

Secondary batteries rely on deintercalation of active ions back and forth between positive and negative electrodes for charging and discharging, and have outstanding character-istics, such as a high energy density, a long cycle life, no pollution, and memoryless effects. Therefore, as a clean energy, the secondary batteries have been gradually popu-larized from electronic products to the field of large appa-ratuses such as electric vehicles, to adapt to the sustainable development strategy of environment and energy. However, compared with conventional fuel vehicles capable of being refueled quickly and timely, the electric vehicles are gener-ally charged at a small rate, thereby generally requiring long charging time, causing range anxiety among consumers, and limiting the rapid popularization of the electric vehicles.

SUMMARY OF THE INVENTION

An object of the present application is to provide a composite graphite material, a method for preparing the same, a negative electrode sheet, a secondary battery, a battery module, a battery pack, and an electrical apparatus, so as to enable the secondary battery to not only have a high energy density, but also have significantly improved fast charging performance and low-temperature power perfor-mance.

A first aspect of the present application provides a com-posite graphite, material comprising a bulk particle and a cladding layer located on at least a partial surface of the bulk particle, where the bulk particle is a secondary particle formed by aggregation of more than two primary particles, the bulk particle comprises artificial graphite, the cladding layer comprises amorphous carbon, and an air oxidation temperature $T_0$ of the composite graphite material is from 630° C. to 730° C. The air oxidation temperature $T_0$ is a temperature corresponding to an intersection of two tangents at two points corresponding to 500° C. and a temperature $T_1$ respectively on a thermogravimetric curve of the composite graphite material, the temperature $T_1$ is a peak temperature of a peak with a largest area in a differential thermogravi-metric curve of the composite graphite material, and the thermogravimetric curve and the differential thermogravi-metric curve may be obtained by thermogravimetric analysis under the following conditions: sample mass: 10±0.05 mg, purge gas: air at a gas flow rate of 60 mL/min, heating rate: 5° C./min, and a test temperature ranging from 35° C. to 950° C.

The air oxidation temperature $T_0$ of the composite graph-ite material can accurately represent a temperature when the composite graphite material begins to lose weight during air oxidation, and then can accurately reflect the number of end faces and the number of defects of the composite graphite material. The air oxidation temperature $T_0$ of the composite graphite material is from 630° C. to 730° C. In this case, the composite graphite material comprises an appropriate num-ber of end faces and an appropriate number of defects, the composite graphite material has favorable transport perfor-mance of active ions and electrons, the active ions and the electrons exchange fast on a surface of the composite graphite material, and the active ions have high solid phase transport capacity within the composite graphite material. Therefore, the secondary battery not only maintains a high energy density, but also has significantly improved fast charging performance and low-temperature power perfor-mance.

In any embodiment of the present application, the air oxidation temperature $T_0$ of the composite graphite material is from 660° C. to 710° C. The air oxidation temperature $T_0$ of the composite graphite material within an appropriate range can enable the composite graphite material to have a more appropriate number of end faces and a more appro-priate number of defects, further improve the transport performance of the active ions and the electrons, and improve the fast charging performance and the low-tem-perature power performance of the secondary battery.

In any embodiment of the present application, the com-posite graphite material further comprises a kinetic carbon material.

In any embodiment of the present application, the kinetic carbon material is located at at least partial interface between primary particles and primary particles of the bulk particle.

In any embodiment of the present application, the kinetic carbon material is located in the cladding layer.

In any embodiment of the present application, the kinetic carbon material is not only located at at least partial interface between the primary particles and the primary particles of the bulk particle, but also located in the cladding layer.

In any embodiment of the present application, a raw material of the kinetic carbon material is selected from one or more of hard carbon, micro-expanded graphite, expanded graphite, or graphene, and an interlayer distance $d_{002}$ between crystal planes of a raw material (002) of the kinetic carbon material is greater than or equal to 0.3358 nm.

Optionally, the interlayer distance $d_{002}$ between the crys-tal planes of the raw material (002) of the kinetic carbon material is from 0.3359 nm to 0.3366 nm.

When the kinetic carbon material obtained from the above raw material of the kinetic carbon material is homoge-neously distributed in the bulk particle and/or the cladding layer of the composite graphite material, such homogeneous distribution contributes to the rapid intercalation and deintercalation of the active ions, thus improving the trans-port performance of the active ions and the electrons, and improving the fast charging performance and the low-temperature power performance of the secondary battery without causing the energy density loss of the secondary battery.

In any embodiment of the present application, based on a total mass of the composite graphite material, a percentage mass content of the kinetic carbon material is from 1% to 30%. Optionally, the percentage mass content of the kinetic carbon material is from 8% to 15%. The percentage mass content of the kinetic carbon material within an appropriate range can enable the composite graphite material to not only have high gram capacity, but also have high solid phase transport capacity of the active ions and high exchange velocity of the active ions and electron charges.

In any embodiment of the present application, an interlayer distance $d_{002}$ between crystal planes of the composite graphite material (002) is from 0.3355 nm to 0.3364 nm. Optionally, the interlayer distance $d_{002}$ between the crystal planes of the composite graphite material (002) is from 0.3356 nm to 0.3361 nm. The composite graphite material has a large interlayer distance $d_{002}$, can improve the solid phase transport capacity of the active ions therein, and can improve the fast charging performance and the low-temperature power performance of the secondary battery.

In any embodiment of the present application, a volume average particle size Dv50 of the composite graphite material is from 8.5 μm to 14.5 μm. Optionally, the volume average particle size Dv50 of the composite graphite material is from 10 μm to 12 μm. When the volume average particle size Dv50 of the composite graphite material is within an appropriate range, the composite graphite material not only has better transport performance of the active ions and the electrons and better fast charging performance, but also has a high powder compaction density.

In any embodiment of the present application, a volume average particle size Dv50 of the bulk particle is from 7.5 μm to 13.5 μm. Optionally, the volume average particle size Dv50 of the bulk particle is from 9.0 μm to 11.5 μm. When the volume average particle size Dv50 of the bulk particle of the composite graphite material is within an appropriate range, the composite graphite material not only has better transport performance of the active ions and the electrons, but also has higher gram capacity.

In any embodiment of the present application, a ratio of a volume average particle size Dv50 of the primary particles to a volume average particle size Dv50 of the secondary particle formed by the primary particles is from 0.45 to 0.75. Optionally, the ratio of the volume average particle size Dv50 of the primary particles to the volume average particle size Dv50 of the secondary particle formed by the primary particles is from 0.55 to 0.65. When the above ratio is within an appropriate range, the bulk particle of the composite graphite material can have a favorable degree of secondary particles, thereby not only contributing to improving the transport performance of the active ions and the electrons of the composite graphite material, but also enabling the composite graphite material to have high structural stability.

In any embodiment of the present application, based on the total mass of the composite graphite material, a percentage mass content of the amorphous carbon in the cladding layer is from 1% to 8%. Optionally, the percentage mass content of the amorphous carbon in the cladding layer is from 2% to 5%. The content of the amorphous carbon within an appropriate range can enable the composite graphite material to not only have high gram capacity, but also have high solid phase transport capacity of the active ions.

In any embodiment of the present application, a powder compaction density of the composite graphite material under a force of 20,000N is from 1.45 g/cm³ to 1.75 g/cm³. Optionally, the powder compaction density of the composite graphite material under the force of 20,000N is from 1.55 g/cm³ to 1.65 g/cm³. When the powder compaction density of the composite graphite material is within an appropriate range, the composite graphite material can enable the negative electrode film layer to have a high compaction density, such that the secondary battery has a high energy density; and further, the composite graphite material has a strong ability to maintain a pore structure of the negative electrode film layer during cycles, and the negative electrode sheet has better electrolyte solution wettability, thereby further contributing to improving the cycling performance of the secondary battery.

A second aspect of the present application provides a method for preparing a composite graphite material, including steps of: S10, providing a coke powder or the coke powder added with a raw material powder of a kinetic carbon material, and graphitizing the coke powder or the coke powder added with the raw material powder of the kinetic carbon material to obtain a bulk particle, where the bulk particle is a secondary particle formed by aggregation of more than two primary particles, and the bulk particle comprises artificial graphite; and S20, mixing the bulk particle with an organic carbon source, or mixing the bulk particle with the organic carbon source and the raw material powder of the kinetic carbon material, and forming a cladding layer comprising amorphous carbon on at least a partial surface of the bulk particle after carbonization, to obtain the composite graphite material. The raw material powder of the kinetic carbon material is added in at least one of steps S10 and S20, a raw material of the kinetic carbon material is selected from one or more of hard carbon, micro-expanded graphite, expanded graphite, or graphene, and an interlayer distance $d_{002}$ between crystal planes of a raw material (002) of the kinetic carbon material is greater than or equal to 0.3358 nm.

An air oxidation temperature $T_0$ of the resulting composite graphite material is from 630° C. to 730° C., the air oxidation temperature $T_0$ is a temperature corresponding to an intersection of two tangents at two points corresponding to 500° C. and a temperature $T_1$ respectively on a thermogravimetric curve of the composite graphite material, the temperature $T_1$ is a peak temperature of a peak with a largest area in a differential thermogravimetric curve of the composite graphite material, and the thermogravimetric curve and the differential thermogravimetric curve may be obtained by thermogravimetric analysis under the following conditions: sample mass: 10±0.05 mg, purge gas: air at a gas flow rate of 60 mL/min, heating rate: 5° C./min, and a test temperature ranging from 35° C. to 950° C.

The method for preparing a composite graphite material in the present application is simple in operation with controllable costs, and can be used for large-scale industrial production. A composite graphite material with an appropriate content of end faces and an appropriate content of defects can be obtained using the method of the present application, such that the secondary battery not only has a high energy density, but also has significantly improved fast charging performance and low-temperature power performance.

In any embodiment of the present application, the interlayer distance 602 between the crystal planes of the raw material (002) of the kinetic carbon material is from 0.3359 nm to 0.3366 nm.

In any embodiment of the present application, based on a total mass of the resulting composite graphite material, a percentage total mass content of the raw material powder of the kinetic carbon material added in steps S10 and S20 is from 1% to 30%. Optionally, the percentage total mass content of the raw material powder of the kinetic carbon material added in steps S10 and S20 is from 8% to 15%.

In any embodiment of the present application, a volume average particle size Dv50 of the coke powder is from 61 μm to 12 μm. Optionally, the volume average particle size Dv50 of the coke powder is from 81 μm to 10 μm.

In any embodiment of the present application, a volume average particle size Dv50 of the raw material powder of the kinetic carbon material is from 31 μm to 12 μm. Optionally, the volume average particle size Dv50 of the raw material powder of the kinetic carbon material is from 4 μm to 9 μm.

In any embodiment of the present application, a ratio of the volume average particle size Dv50 of the coke powder to the volume average particle size Dv50 of the raw material powder of the kinetic carbon material is from 1.05 to 1.75. Optionally, the ratio of the volume average particle size Dv50 of the coke powder to the volume average particle size Dv50 of the raw material powder of the kinetic carbon material is from 1.2 to 1.5. The ratio of the volume average particle size Dv50 of the coke powder to the volume average particle size Dv50 of the raw material powder of the kinetic carbon material within an appropriate range can enable the bulk particle of the composite graphite material to have a favorable degree of secondary particles.

In any embodiment of the present application, the method further includes: adding a binder in S10, mixing the binder with the coke powder for granulation and then graphitization to obtain the bulk particle, or mixing the binder with the coke powder added with the raw material powder of the kinetic carbon material for granulation and then graphitization to obtain the bulk particle. The addition of the binder can enable the bulk particle of the composite graphite material to have a favorable degree of secondary particles, thereby not only contributing to improving the transport performance of the active ions and the electrons of the composite graphite material, but also enabling the composite graphite material to have a high structural stability.

In any embodiment of the present application, based on the total mass of the resulting composite graphite material, a percentage mass content of the binder is from 3% to 12%. Optionally, the percentage mass content of the binder is from 5% to 8%. The content of the binder within an appropriate range can prevent the particles from excessive agglomeration, so that the bulk particle of the composite graphite material has a favorable degree of secondary particles.

In any embodiment of the present application, the binder is selected from an asphalt.

In any embodiment of the present application, a volume average particle size Dv50 of particles obtained from the granulation is from 8 μm to 14 μm. Optionally, the volume average particle size Dv50 of the particles obtained from the granulation is from 9.5 μm to 12 μm.

In any embodiment of the present application, in S20, the organic carbon source is selected from one or more of a coal asphalt, a petroleum asphalt, a phenolic resin, or a coconut shell. Optionally, the organic carbon source is selected from a petroleum asphalt.

In any embodiment of the present application, an addition amount of the organic carbon source is such that a percentage mass content of amorphous carbon obtained from carbonization of the organic carbon source is from 1% to 8%, based on the total mass of the resulting composite graphite material. Optionally, the addition amount of the organic carbon source is such that the percentage mass content of the amorphous carbon obtained from carbonization of the organic carbon source is from 2% to 5%. The addition amount of the organic carbon source within an appropriate range can enable the composite graphite material to not only have high gram capacity, but also have high solid phase transport capacity of the active ions.

A third aspect of the present application provides a negative electrode sheet, comprising a negative electrode current collector and a negative electrode film layer arranged on at least one surface of the negative electrode current collector, where the negative electrode film layer comprises the composite graphite material in the first aspect of the present application or the composite graphite material prepared in accordance with the method in the second aspect of the present application.

In any embodiment of the present application, the negative electrode film layer further comprises an additive, the additive is selected from one or more of hard carbon, micro-expanded graphite, expanded graphite, or graphene, and an interlayer distance $d_{002}$ between crystal planes of the additive (002) is greater than or equal to 0.3358 nm. These additives have favorable transport performance of the active ions and the electrons, and can enable the secondary battery to not only have a high energy density, but also have significantly improved fast charging performance and low-temperature power performance.

In any embodiment of the present application, the interlayer distance $d_{002}$ between the crystal planes of the additive (002) is from 0.3359 nm to 0.3366 nm.

In any embodiment of the present application, based on the total mass of the negative electrode film layer, a percentage mass content of the additive is from 1% to 20%. Optionally, the percentage mass content of the additive is from 3% to 8%. The percentage mass content of the additive within an appropriate range can enable the secondary battery to not only have a high energy density, but also have significantly improved fast charging performance and low-temperature power performance. Further, when the percentage mass content of the additive is within the appropriate range, the additive has a better ability to maintain a pore structure of the negative electrode film layer during cycles, the negative electrode sheet has better electrolyte solution wettability, and the secondary battery can further have favorable cycling performance.

A fourth aspect of the present application provides a secondary battery, comprising the negative electrode sheet in the third aspect of the present application.

A fifth aspect of the present application provides a battery module, comprising the secondary battery in the fourth aspect of the present application.

A sixth aspect of the present application provides a battery pack, comprising one of the secondary batteries in the fourth aspect of the present application or the battery module in the fifth aspect of the present application.

A seventh aspect of the present application provides an electrical apparatus, comprising at least one of the secondary batteries in the fourth aspect of the present application, the battery module in the fifth aspect of the present application, or the battery pack in the sixth aspect of the present application.

The secondary battery in the present application not only has a high energy density, but also has significantly improved fast charging performance and low-temperature power performance. The battery module, the battery pack, and the electrical apparatus in the present application comprise the secondary battery provided in the present application, and thus have at least the same advantages as the secondary battery.

DESCRIPTION OF DRAWINGS

To more clearly describe the technical solutions of the examples of the present application, the accompanying drawings to be used in the examples of the present application will be briefly introduced below. Apparently, the drawings described below are merely some embodiments of the present application. For those of ordinary skills in the art, other drawings may also be obtained based on these drawings without making creative work.

DETAILED DESCRIPTION

Figure 1:
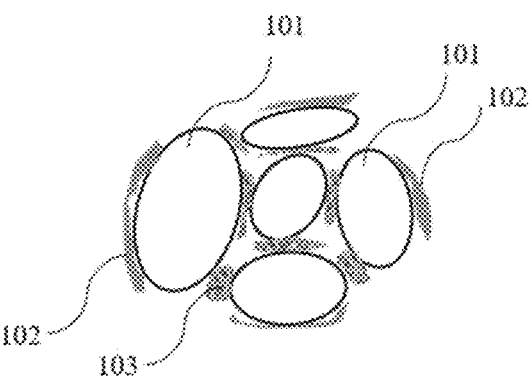
FIG. 1 is a schematic diagram of a composite graphite material in an embodiment of the present application.

Embodiments of a composite graphite material, a method for preparing the same, a negative electrode sheet, a secondary battery, a battery module, a battery pack, and an electrical apparatus in the present application are specifically disclosed in detail below by properly referring to the detailed description of the drawings. However, there will be cases where unnecessary detailed descriptions are omitted. For example, there are cases where detailed descriptions of well-known items and repeated descriptions of actually identical structures are omitted. This is to avoid unnecessary redundancy in the following descriptions and to facilitate the understanding by those skilled in the art. In addition, the drawings and subsequent descriptions are provided for those skilled in the art to fully understand the present application, and are not intended to limit the subject matter recited in the claims.

The "range" disclosed in the present application is defined in terms of lower and upper limits, and a given range is defined by selecting a lower limit and an upper limit, which define the boundaries of a particular range. A range defined in this manner may be inclusive or exclusive of end values, and may be arbitrarily combined, that is, any lower limit may be combined with any upper limit to form a range. For example, if the ranges of 60-120 and 80-110 are listed for a particular parameter, it is understood that the ranges of 60-110 and 80-120 are also expected. Additionally, if the minimum range values 1 and 2 are listed, and if the maximum range values 3, 4 and 5 are listed, the following ranges are all contemplated: 1-3, 1-4, 1-5, 2-3, 2-4 and 2-5. In the present application, unless stated otherwise, the numerical range "a-b" represents an abbreviated representation of any combination of real numbers between a to b, wherein both a and b are real numbers. For example, the numerical range "0-5" means that all real numbers between "0-5" have been listed herein, and "0-5" is just an abbreviated representation of the combination of these numerical values. Additionally, when it is stated that a certain parameter is an integer of ≥2, it is equivalent to disclosing that the parameter is, for example, an integer of 2, 3, 4, 5, 6, 7, 8, 9, 10, 11, 12, etc.

Unless otherwise specified, all embodiments and optional embodiments of the present application may be combined with each other to form new technical solutions.

Unless otherwise specified, all technical features and optional technical features of the present application may be combined with each other to form new technical solutions.

Unless otherwise specified, all steps of the present application may be performed sequentially or randomly, and preferably sequentially. For example, the method includes steps (a) and (b), indicating that the method may include steps (a) and (b) performed sequentially, or may include steps (b) and (a) performed sequentially. For example, the reference to the method may further comprise step (c), meaning that step (c) may be added to the method in any order, for example, the method may comprise steps (a), (b) and (c), or may comprise steps (a), (c) and (b), or may comprise steps (c), (a) and (b), and so on.

Unless otherwise specifically stated, the "including" and "comprising" mentioned in the present application mean open-ended, or may be closed-ended. For example, the "including" and "comprising" may indicate that it is possible to include or comprise other components not listed, and it is also possible to include or comprise only the listed components.

Unless otherwise specified, the term "or" is inclusive in the present application. By way of example, the phrase "A or B" means "A, B, or both A and B". More specifically, the condition "A or B" is satisfied under any one of the following conditions: A is true (or present) and B is false (or absent); A is false (or absent) and B is true (or present); or both A and B are true (or present).

In the present application, the "micro-expanded graphite" refers to a graphite with from 80 to 200 loose volume change (i.e., expansion multiple) before and after expansion; while the "expanded graphite" refers to a graphite with more than 200 loose volume change (expansion multiple) before and after expansion.

In the present application, the "coke raw material" refers to an ingredient that can be treated to obtain "coke," i.e., a raw material used for preparing coke; the "coke" refers to a product obtained from coking of the coke raw material; the "coke powder" is completely consistent with "coke" in composition; the "coke powder" refers to "coke" existing in a powder form of a certain particle size; and the "coke" is treated by, e.g., crushing, to obtain the "coke powder."

In the present application, the "raw material of the kinetic carbon material" and the "raw material powder of the kinetic carbon material" are completely consistent in composition, and the "raw material powder of the kinetic carbon material" refers to the "raw material of the kinetic carbon material" existing in a powder form of a certain particle size. The "kinetic carbon material" refers to a product obtained from graphitization and/or carbonization of the "raw material of the kinetic carbon material" or the "raw material powder of the kinetic carbon material."

In the present application, the "amorphous carbon" refers to an approximately amorphous carbon material in a transition state with a low degree of graphitization and crystallization (or without a fixed shape and a periodic structure law). In the present application, the "amorphous carbon" refers to a product obtained from carbonization of an organic carbon source.

The key to improving the fast charging performance of the secondary battery is to improve the performance of the negative electrode sheet and the negative electrode active material. In order to improve the fast charging performance of the secondary battery, hard carbon is generally selected for use as the negative electrode active material in accordance with existing technologies, but the hard carbon has low gram capacity and low compaction density, such that the secondary battery is difficult to have a high energy density, thereby significantly reducing the range of electric vehicles. With graphite as the negative electrode active material, the secondary battery can have a high energy density, but has poor fast charging performance and low-temperature power performance.

After a lot of researches, the inventors presented a novel composite graphite material, which can enable the secondary battery to not only have a high energy density, but also have significantly improved fast charging performance and low-temperature power performance.

Composite Graphite Material

A first aspect of embodiments of the present application provides a composite graphite material, comprising a bulk particle and a cladding layer located on at least a partial surface of the bulk particle, where the bulk particle is a secondary particle formed by aggregation of more than two primary particles, the bulk particle comprises artificial graphite, the cladding layer comprises amorphous carbon, and an air oxidation temperature $T_0$ of the composite graphite material is from 630° C. to 730° C. The air oxidation temperature $T_0$ is a temperature corresponding to an intersection of two tangents at two points corresponding to 500° C. and a temperature $T_1$ respectively on a thermogravimetric curve of the composite graphite material, the temperature $T_1$ is a peak temperature of a peak with a largest area in a differential thermogravimetric curve of the composite graphite material, and the thermogravimetric curve and the differential thermogravimetric curve may be obtained by thermogravimetric analysis under the following conditions: sample mass: 10±0.05 mg, purge gas: air at a gas flow rate of 60 mL/min, heating rate: 5° C./min, and a test temperature ranging from 35° C. to 950° C.

The air oxidation temperature $T_0$ may be determined based on thermogravimetric analysis including the following steps: performing thermogravimetric test on the composite graphite material (mass: 10±0.05 mg) with air as a purge gas at a gas flow rate of 60 mL/min, at a heating rate of 5° C./min, at a test temperature ranging from 35° C. to 950° C., to obtain a thermogravimetric curve (also known as a TG curve) and a differential thermogravimetric curve (also known as a DTG curve), reading the peak temperature $T_1$ of the peak with the largest area from the differential thermogravimetric curve, and determining an intersection of two tangents at two points corresponding to 500° C. and the temperature $T_1$ respectively on the thermogravimetric curve, where a temperature corresponding to the intersection on the thermogravimetric curve is the air oxidation temperature $T_0$ of the composite graphite material.

The larger the number of end faces and the number of defects of graphite are, the larger the number of sites where active ions can be deintercalated from the graphite is, and the better the fast charging performance and the low-temperature power performance of the secondary battery are. The inventors accidentally found that the number of end faces and the number of defects of the graphite are closely associated with the temperature at which the graphite begins to lose weight during air oxidation. The lower the temperature at which the graphite begins to lose weight during air oxidation is, the larger the number of end faces and the number of defects of the graphite are, and the better the fast charging performance and the low-temperature power performance of the secondary battery are.

The inventors accidentally found that the temperature corresponding to the intersection of the two tangents at the two points corresponding to 500° C. and the peak temperature $T_1$ of the peak with the largest area respectively on the thermogravimetric curve is the air oxidation temperature $T_0$ of the graphite, which can accurately represent the temperature at which the graphite begins to lose weight during air oxidation, and then can accurately reflect the number of end faces and the number of defects of the graphite. The air oxidation temperature $T_0$ of the composite graphite material in the first aspect of the present application is from 630° C. to 730° C. In this case, the composite graphite material comprises an appropriate number of end faces and an appropriate number of defects, the composite graphite material has favorable transport performance of the active ions and electrons, the active ions and the electrons exchange fast on a surface of the composite graphite material, and the active ions have high solid phase transport capacity within the composite graphite material. Therefore, the secondary battery not only maintains a high energy density, but also has significantly improved fast charging performance and low-temperature power performance. The inventors further found that existing graphite has a small interlayer distance, a small number of end faces, a small number of defects, and a very high air oxidation temperature $T_0$, thereby hardly enabling the secondary battery to have better fast charging performance and low-temperature power performance.

In some embodiments, the air oxidation temperature $T_0$ of the composite graphite material is 630° C.-730° C., 640° C.-730° C., 650° C.-730° C., 660° C.-730° C., 670° C.-730° C., 680° C.-730° C., 690° C.-730° C., 700° C.-730° C., 710° C.-730° C., 720° C.-730° C., 630° C.-720° C., 640° C.-720° C., 650° C.-720° C., 660° C.-720° C., 670° C.-720° C., 680° C.-720° C., 690° C.-720° C., 700° C.-720° C., 710° C.-720° C., 630° C.-710° C., 640° C.-710° C., 650° C.-710° C., 660° C.-710° C., 670° C.-710° C., 680° C.-710° C., 690° C.-710° C., 700° C.-710° C., 630° C.-700° C., 640° C.-700° C., 650° C.-700° C., 660° C.-700° C., 670° C.-700° C., 680° C.-700° C., 690° C.-700° C., 630° C.-690° C., 640° C.-690° C., 650° C.-690° C., 660° C.-690° C., 670° C.-690° C., 680° C.-690° C., 630° C.-680° C., 640° C.-680° C., 650° C.-680° C., 660° C.-680° C., or 670° C.-680° C.

The air oxidation temperature $T_0$ of the composite graphite material within an appropriate range can enable the composite graphite material to have a more appropriate number of end faces and a more appropriate number of defects, further improve the transport performance of the active ions and the electrons, and improve the fast charging performance and the low-temperature power performance of the secondary battery.

In some embodiments, the composite graphite material further comprises a kinetic carbon material. In some embodiments, the kinetic carbon material is located at at least partial interface between the primary particles and the primary particles of the bulk particle. In this case, the bulk particle of the negative electrode active material includes primary particles of artificial graphite and a kinetic carbon material located between the primary particles.

In some embodiments, the kinetic carbon material is located in the cladding layer. In this case, the cladding layer includes both the amorphous carbon and the kinetic carbon material.

In some embodiments, the kinetic carbon material is not only located at at least partial interface between the primary particles and the primary particles of the bulk particle, but also located in the cladding layer.

Figure 2:
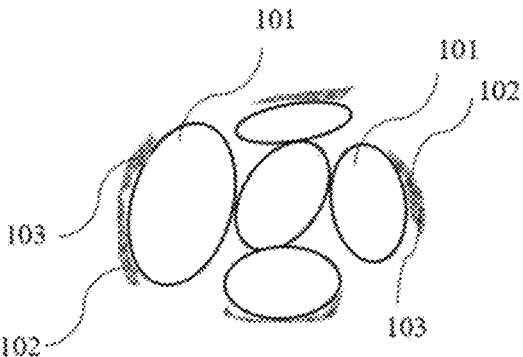
FIG. 2 is a schematic diagram of the composite graphite material in another embodiment of the present application.
Figure 3:
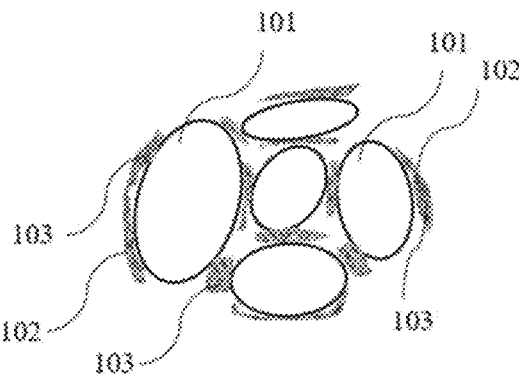
FIG. 3 is a schematic diagram of the composite graphite material in still another embodiment of the present application.

FIG. 1 to FIG. 3 are schematic diagrams of a composite graphite material in different embodiments of the present application. Referring to FIG. 1 to FIG. 3, the composite graphite material comprises a bulk particle and a cladding layer 102 located on at least a partial surface of the bulk particle, where the bulk particle is a secondary particle formed by aggregation of more than two primary particles 101. Referring to FIG. 1, a kinetic carbon material 103 may be located at at least partial interface between the primary particles 101 and the primary particles 101 of the bulk particle. Referring to FIG. 2, the kinetic carbon material 103 may be further located in the cladding layer 102. Referring to FIG. 3, the kinetic carbon material 103 may be not only located at at least partial interface between the primary particles 101 and the primary particles 101 of the bulk particle, but also located in the cladding layer 102.

In some embodiments, based on a total mass of the composite graphite material, a percentage mass content of the kinetic carbon material is from 1% to 30%. For example, the percentage mass content of the kinetic carbon material is 3%-30%, 3%-25%, 3%-20%, 3%-15%, 5%-30%, 5%-25%, 5%-20%, 5%-15%, 8%-30%, 8%-25%, 8%-20%, 8%-15%, or 8%-12%. The percentage mass content of the kinetic carbon material is a sum of a percentage mass content of the kinetic carbon material located at at least partial interface between the primary particles and the primary particles of the bulk particle and a percentage mass content of the kinetic carbon material located in the cladding layer.

The percentage mass content of the kinetic carbon material within an appropriate range can enable the composite graphite material to not only have high gram capacity, but also have high solid phase transport capacity of active ions and high exchange velocity of the active ions and electron charges, such that the secondary battery not only has a high energy density, but also has significantly improved fast charging performance and low-temperature power performance. Further, when the percentage mass content of the kinetic carbon material is within the appropriate range, the kinetic carbon material has a better ability to maintain a pore structure of the negative electrode film layer during cycles, the negative electrode sheet has better electrolyte solution wettability, and the secondary battery can further have favorable cycling performance. In some embodiments, a raw material of the kinetic carbon material is selected from one or more of hard carbon, micro-expanded graphite, expanded graphite, or graphene.

Optionally, gram capacity of the hard carbon under 1 V is more than or equal to 320 mAh/g, and a powder compaction density of the hard carbon under a force of 20,000N is greater than or equal to 1.05 g/cm$^3$.

Optionally, the raw material of the kinetic carbon material is selected from one or more of micro-expanded graphite or expanded graphite. In particular, the raw material of the kinetic carbon material is selected from expanded graphite.

In some embodiments, an interlayer distance $d_{002}$ between crystal planes of a raw material (002) of the kinetic carbon material is greater than or equal to 0.3358 nm. Optionally, the interlayer distance $d_{002}$ between the crystal planes of the raw material (002) of the kinetic carbon material is from 0.3359 nm to 0.3366 nm.

The interlayer distance $d_{002}$ of the raw material of the kinetic carbon material is greater than that of conventional graphite. When the kinetic carbon material obtained therefrom is homogeneously distributed in the bulk particle and/or the cladding layer of the composite graphite material, such homogeneous distribution contributes to rapid intercalation and deintercalation of the active ions, thus improving the transport performance of the active ions and the electrons, and improving the fast charging performance and the low-temperature power performance of the secondary battery without causing the energy density loss of the secondary battery.

The raw material of the kinetic carbon material further has high compression resistance, and has a strong ability to maintain the pore structure of the negative electrode film layer during cycles; and the negative electrode sheet has better electrolyte solution wettability, thereby further contributing to improving the cycling performance of the secondary battery.

In some embodiments, an interlayer distance $d_{002}$ between crystal planes of the composite graphite material (002) is from 0.3355 nm to 0.3364 nm. Optionally, the interlayer distance $d_{002}$ between the crystal planes of the composite graphite material (002) is from 0.3356 nm to 0.3361 nm.

The composite graphite material has a large interlayer distance $d_{002}$, can improve the solid phase transport capacity of the active ions therein, and can improve the fast charging performance and the low-temperature power performance of the secondary battery.

In some embodiments, a volume average particle size Dv50 of the composite graphite material is from 8.5 μm to 14.5 μm. Optionally, the volume average particle size Dv50 of the composite graphite material is from 10 μm to 12 μm.

When the volume average particle size Dv50 of the composite graphite material is within an appropriate range, the composite graphite material not only has better transport performance of the active ions and the electrons and better fast charging performance, but also has a high powder compaction density.

In some embodiments, a volume average particle size Dv50 of the bulk particle is from 7.5 μm to 13.5 μm. Optionally, the volume average particle size Dv50 of the bulk particle is from 9.0 μm to 11.5 μm.

When the volume average particle size Dv50 of the bulk particle of the composite graphite material is within an appropriate range, the composite graphite material not only has better transport performance of the active ions and the electrons, but also has higher gram capacity.

In some embodiments, a ratio of a volume average particle size Dv50 of the primary particles to a volume average particle size Dv50 of the secondary particle (i.e., the bulk particle) formed by the primary particles is from 0.45 to 0.75. Optionally, the ratio of the volume average particle size Dv50 of the primary particles to the volume average particle size Dv50 of the secondary particle formed by the primary particles is from 0.55 to 0.65.

When the ratio of the volume average particle size Dv50 of the primary particles to the volume average particle size Dv50 of the secondary particle formed by the primary particles is within an appropriate range, the bulk particle of the composite graphite material can have a favorable degree of secondary particles, thereby not only contributing to improving the transport performance of the active ions and the electrons of the composite graphite material, but also enabling the composite graphite material to have high structural stability. Further, the bulk particle has a strong ability to maintain the pore structure of the negative electrode film layer during cycles, and the negative electrode sheet has better electrolyte solution wettability, thereby further contributing to improving the cycling performance of the secondary battery.

In some embodiments, based on the total mass of the composite graphite material, a percentage mass content of amorphous carbon in the cladding layer is from 1% to 8%. Optionally, the percentage mass content of the amorphous carbon in the cladding layer is from 2% to 5%.

The content of the amorphous carbon within an appropriate range can enable the composite graphite material to not only have high gram capacity, but also have high solid phase transport capacity of the active ions.

In some embodiments, at least a partial surface of the bulk particle is cladded by the cladding layer. Optionally, the composite graphite material comprises the bulk particle and the cladding layer cladding at least 80% surface of the bulk particle. In particular, the composite graphite material comprises the bulk particle and the cladding layer cladding at least 90% surface of the bulk particle.

In some embodiments, the powder compaction density of the composite graphite material under a force of 20,000N is from 1.45 $g/cm^3$ to 1.75 $g/cm^3$. Optionally, the powder compaction density of the composite graphite material under the force of 20,000N is from 1.55 $g/cm^3$ to 1.65 $g/cm^3$.

The powder compaction density of the composite graphite material within an appropriate range can enable the negative electrode film layer to have a high compaction density, such that the secondary battery has a high energy density. When the powder compaction density of the composite graphite material is within the appropriate range, the composite graphite material has a strong ability to maintain the pore structure of the negative electrode film layer during cycles, and the negative electrode sheet has better electrolyte solution wettability, thereby further contributing to improving the cycling performance of the secondary battery.

In the present application, a volume average particle size Dv50 of a material has a well-known meaning in the art, represents a corresponding particle size when a cumulative volume distribution percentage of the material reaches 50%, and may be determined using well-known instruments and methods in the art, for example, may be conveniently determined using a laser particle size analyzer, such as Mastersizer 2000E laser particle size analyzer of Malvern Instruments Ltd, by referring to GB/T 19077-2016 Particle size analysis-laser diffraction methods.

In the present application, an interlayer distance $d_{002}$ of a material has a well-known meaning in the art, and may be determined using well-known instruments and methods in the art. For example, the $d_{002}$ may be determined using an X-ray powder diffractometer (such as PANalytical X'pert PRO) by referring to JIS K 0131-1996 and JB/T 4220-2011.

In the present application, a powder compaction density of a material has a meaning well-known in the art, and may be determined using an instrument and a method known in the art, for example, may be determined using an electronic pressure testing machine (e.g., UTM7305) by referring to the standard GB/T24533-2009. An example test method is as follows: 1 g of a material is weighed, added into a mold with a base area of 1.327 $cm^2$, pressurized to 2,000 kg (equivalent to 20,000N), kept under this pressure for 30 s, then depressurized, and kept under this pressure for 10 s. Then, the powder compaction density of the material under the force of 20,000N is recorded and computed.

In the present application, a gram capacity of a material has a meaning well-known in the art, and may be determined using an instrument and a method known in the art. An example test method is as follows: a to-be-tested material, a conductive agent carbon black (Super P), and a binder polyvinylidene fluoride (PVDF) at a mass ratio of 91.6:1.8:6.6 are sufficiently mixed in a solvent N-methyl pyrrolidone (NMP) to prepare a slurry; and the resulting slurry is coated on a copper foil current collector, and is dried in a drying oven for later use. A metal lithium sheet is used as a counter electrode, and a polyethylene (PE) film is used as a separator. Ethylene carbonate (EC), ethyl methyl carbonate (EMC), and diethyl carbonate (DEC) at a volume ratio of 1:1:1 are mixed, and then $LiPF_6$ is sufficiently dissolved in the resulting solution to obtain an electrolyte solution with a concentration of $LiPF_6$ being 1 mol/L. A CR2430 button battery is assembled in a glove box protected under argon. The resulting button battery is left to stand for 12 hours, discharged to 0.005V at a constant current of 0.05 C at 25° C., left to stand for 10 minutes, then discharged to 0.005V at a constant current of 50 µA, left to stand for 10 minutes, then discharged to 0.005V at a constant current of 10 µA; and then charged to 2V at a constant current of 0.1 C, to obtain the charging capacity. A ratio of the charging capacity to the material mass is the gram capacity of the material.

Method for Preparing Composite Graphite Material

A second aspect of embodiments of the present application provides a method for preparing a composite graphite material. The method includes steps of: S10, providing a coke powder or the coke powder added with a raw material powder of a kinetic carbon material, and graphitizing the coke powder or the coke powder added with the raw material powder of the kinetic carbon material to obtain a bulk particle, where the bulk particle is a secondary particle formed by aggregation of more than two primary particles, and the bulk particle comprises artificial graphite; and S20, mixing the bulk particle with an organic carbon source, or mixing the bulk particle with the organic carbon source and the raw material powder of the kinetic carbon material, and forming a cladding layer comprising amorphous carbon on at least a partial surface of the bulk particle after carbonization, to obtain the composite graphite material.

The raw material powder of the kinetic carbon material is added in at least one of steps S10 and S20, a raw material of the kinetic carbon material is selected from one or more of hard carbon, micro-expanded graphite, expanded graphite, or graphene, and an interlayer distance $d_{002}$ between crystal planes of a raw material (002) of the kinetic carbon material is greater than or equal to 0.3358 nm.

An air oxidation temperature $T_0$ of the resulting composite graphite material is from 630° C. to 730° C., the air oxidation temperature $T_0$ is a temperature corresponding to an intersection of two tangents at two points corresponding to 500° C. and a temperature $T_1$ respectively on a thermogravimetric curve of the composite graphite material, the temperature $T_1$ is a peak temperature of a peak with a largest area in a differential thermogravimetric curve of the composite graphite material, and the thermogravimetric curve and the differential thermogravimetric curve may be obtained by thermogravimetric analysis under the following conditions: sample mass: 10±0.05 mg, purge gas: air at a gas flow rate of 60 mL/min, heating rate: 5° C./min, and a test temperature ranging from 35° C. to 950° C.

Specifically, the air oxidation temperature $T_0$ may be determined based on thermogravimetric analysis including the following steps: performing thermogravimetric test on the composite graphite material (mass: 10±0.05 mg) with air as a purge gas at a gas flow rate of 60 mL/min, at a heating rate of 5° C./min, at a test temperature ranging from 35° C. to 950° C., to obtain a thermogravimetric curve and a differential thermogravimetric curve, reading the peak temperature $T_1$ of the peak with the largest area from the differential thermogravimetric curve, and determining an intersection of two tangents at two points corresponding to 500° C. and the temperature $T_1$ respectively on the thermogravimetric curve, where a temperature corresponding to the intersection on the thermogravimetric curve is the air oxidation temperature $T_0$ of the composite graphite material.

The method for preparing a composite graphite material in the present application is simple in operation with controllable costs, and can be used for large-scale industrial production.

A composite graphite material with an appropriate content of end faces and an appropriate content of defects can be obtained using the method of the present application, such that the secondary battery not only has a high energy density, but also has significantly improved fast charging performance and low-temperature power performance.

In some embodiments, gram capacity of the hard carbon under 1 V is more than or equal to 320 mAh/g, and a powder compaction density of the hard carbon under a force of 20,000N is greater than or equal to 1.05 g/cm³.

In some embodiments, a raw material of the kinetic carbon material is selected from one or more of micro-expanded graphite or expanded graphite. Optionally, the raw material of the kinetic carbon material is selected from expanded graphite.

In some embodiments, the interlayer distance $d_{002}$ between the crystal planes of the raw material (002) of the kinetic carbon material is from 0.3359 nm to 0.3366 nm.

In some embodiments, the method for providing a coke powder includes steps of: coking the coke raw material to obtain coke; and crushing, shaping, and grading the resulting coke to obtain the coke powder.

In some embodiments, the coke may be purchased directly.

Optionally, the coke raw material may be selected from one or more of a petroleum-based raw material or a coal-based raw material. As an example, the petroleum-based raw material is selected from one or more of a heavy oil, a residual oil, or a vacuum residue, and the coal-based raw material is mainly selected from a coal asphalt. The heavy oil, the residual oil, and the vacuum residue are generally produced in a petroleum refining process, and the coal asphalt is generally produced in a coal carbonization process.

In some embodiments, the coke includes one or more of petroleum-based non-needle coke, petroleum-based needle coke, coal-based non-needle coke, or coal-based needle coke. Optionally, the coke includes one or more of petroleum-based non-needle coke (such as petroleum calcined coke or petroleum-based raw coke) or petroleum-based needle coke. In particular, the coke includes petroleum-based raw coke. Use of appropriate cock can enable the resulting composite graphite material to have an appropriate number of end faces and an appropriate number of defects, and then have favorable transport performance of active ions and electrons and high structural stability, thereby improving the fast charging performance and the low-temperature power performance of the secondary battery.

Optionally, the coke raw material is coked in a delayed coker. The delayed coker comprises a heating furnace and a coke chamber. The delayed coking process refers to a process of first rapidly heating the coke raw material in the heating furnace to a required coking temperature, and then generating the coke in the coke chamber through processes, such as preheating and cooling.

The coke may be crushed using a device and a method known in the art, such as a jet mill, a mechanical mill, a roller mill, or other crushing devices.

The shape of the crushed coke powder may include one or more of a block shape, a spherical shape, and a near-spherical shape. After the crushing is completed, corner angles of the coke powder may be polished by shaping. The higher the shaping degree is, the closer the powder particles are to a spherical shape, thereby increasing the number of active ion deintercalation sites on a surface of the composite graphite material. The shaping further contributes to the subsequent granulation process, so that the secondary particle in the resulting composite graphite material has high structural stability.

The coke powder may be shaped using a device and a method known in the art, such as a shaper or other shaping devices.

In the process of crushing and shaping, many undersized particles will usually be produced, and sometimes, oversized particles will also be produced. Therefore, the particles may be graded as required, to remove the undersized particles and the oversized particles in the powder. The coke powder with favorable particle size distribution can be obtained after grading, so as to facilitate the subsequent granulation and cladding processes. The coke powder may be graded using a device and a method known in the art, such as a grading screen, a gravity grader, or a centrifugal grader.

In some embodiments, a volume average particle size Dv50 of the coke powder is from 6 μm to 12 μm. Optionally, the volume average particle size Dv50 of the coke powder is from 8 μm to 10 μm.

In some embodiments, the method for providing a raw material powder of a kinetic carbon material includes steps of: crushing, shaping, and grading the raw material of the kinetic carbon material, to obtain the raw material powder of the kinetic carbon material. The method for crushing, shaping, and grading the raw material of the kinetic carbon material is the same as the above method for crushing, shaping, and grading the coke.

In some embodiments, a volume average particle size Dv50 of the raw material powder of the kinetic carbon material is from 3 μm to 12 μm. Optionally, the volume average particle size Dv50 of the raw material powder of the kinetic carbon material is from 4 μm to 9 μm.

In some embodiments, a ratio of the volume average particle size Dv50 of the coke powder to the volume average particle size Dv50 of the raw material powder of the kinetic carbon material is from 1.05 to 1.75. Optionally, the ratio of the volume average particle size Dv50 of the coke powder to the volume average particle size Dv50 of the raw material powder of the kinetic carbon material is from 1.2 to 1.5. The ratio of the volume average particle size Dv50 of the coke powder to the volume average particle size Dv50 of the raw material powder of the kinetic carbon material within an appropriate range can enable the bulk particle of the composite graphite material to have a favorable degree of secondary particles.

In some embodiments, a mass ratio of the coke powder to the raw material powder of the kinetic carbon material is 1-20:99-80 in the coke powder added with the raw material powder of the kinetic carbon material. Optionally, a mass ratio of the coke powder to the raw material of the kinetic carbon material is 3-12:97-88. The mass ratio of the coke powder to the raw material powder of the kinetic carbon material within an appropriate range contributes to obtaining a composite graphite material with an appropriate content of end faces and an appropriate content of defects, such that the secondary battery not only has a high energy density, but also has significantly improved fast charging performance and low-temperature power performance.

In some embodiments, based on a total mass of the resulting composite graphite material, a percentage total mass content of the raw material powder of the kinetic carbon material added in steps S10 and S20 is from 1% to 30%, for example, 3%-30%, 3%-25%, 3%-20%, 3%-15%, 5%-30%, 5%-25%, 5%-20%, 5%-15%, 8%-30%, 8%-25%, 8%-20%, 8%-15%, or 8%-12%.

In some embodiments, the method further includes a step of: adding a binder in S10. The binder is mixed with the coke powder for granulation and then graphitization to obtain the bulk particle, or the binder is mixed with the coke powder added with the raw material powder of the kinetic carbon material for granulation and then graphitization to obtain the bulk particle.

The addition of the binder can enable the bulk particle of the composite graphite material to have a favorable degree of secondary particles, thereby not only contributing to improving the transport performance of the active ions and the electrons of the composite graphite material, but also enabling the composite graphite material to have a high structural stability.

Optionally, a percentage mass content of the binder is from 3% to 12%, based on the total mass of the resulting composite graphite material. Further optionally, the percentage mass content of the binder is from 5% to 8%. The content of the binder within an appropriate range can prevent the particles from excessive agglomeration, so that the bulk particle of the composite graphite material has a favorable degree of secondary particles.

Optionally, the binder is selected from an asphalt. Optionally, a softening point of the asphalt is above 200° C.

Optionally, the asphalt is selected from one or more of a coal asphalt or a petroleum asphalt.

Optionally, a volume average particle size Dv50 of particles obtained from the granulation is from 81 μm to 14 μm. In particular, the volume average particle size Dv50 of the particles obtained from the granulation is from 9.51 μm to 12 μm.

A device and a method known in the art, such as a granulator, may be used for granulation. The granulator generally comprises a stifling reactor and a module for temperature control of the reactor. Controlling, e.g., a stifling speed, a heating rate, a granulation temperature, and a cooling rate in the granulation process can control the degree of granulation and the structural strength of particles, and can enable the volume average particle size Dv50 of the bulk particle of the finally obtained composite graphite material to be within a desired range.

In some embodiments, in S10, the graphitization temperature may be from 2800° C. to 3200° C. Optionally, the graphitization temperature may be from 2900° C. to 3100° C. The graphitization can enable the bulk particle to have an appropriate degree of graphitization, such that the composite graphite material has high gram capacity. The graphitization further results in low lattice expansion of the bulk particle in the process of deintercalation of the active ions. The graphitization can further effectively eliminate the structural defects in the bulk phase of the bulk particle, and improve the cycling performance of the secondary battery.

In some embodiments, in S10, the graphitization duration may be from 10 days to 15 days.

A device and a method known in the art, such as a graphitization furnace, and particularly an Acheson furnace, may be used for granulation. After the graphitization is completed, a small amount of oversized particles formed by agglomeration of granulation products during graphitization may be further removed by screening, thereby preventing the oversized particles from affecting the processing performance of the composite graphite material, such as stability and coating performance of a negative electrode slurry.

In some embodiments, in S10, the volume average particle size Dv50 of the resulting bulk particle is from 7.5 μm to 13.5 μm. Optionally, the volume average particle size Dv50 of the resulting bulk particle is from 9.0 μm to 11.5 μm.

In some embodiments, in S20, the organic carbon source is selected from one or more of a coal asphalt, a petroleum asphalt, a phenolic resin, or a coconut shell. Optionally, the organic carbon source is selected from a petroleum asphalt. Optionally, a softening point of the coal asphalt and the petroleum asphalt is below 250° C.

In some embodiments, an addition amount of the organic carbon source is such that a percentage mass content of the amorphous carbon obtained from carbonization of the organic carbon source is from 1% to 8%, based on the total mass of the resulting composite graphite material. Optionally, the addition amount of the organic carbon source is such that the percentage mass content of the amorphous carbon obtained from carbonization of the organic carbon source is from 2% to 5%. The addition amount of the organic carbon source within an appropriate range can enable the composite graphite material to not only have high gram capacity, but also have high solid phase transport capacity of the active ions.

In some embodiments, in S20, the carbonization temperature is from 700° C. to 1,800° C. Optionally, the carbonization temperature is from 1,000° C. to 1,300° C. The carbonization temperature within an appropriate range can carbonize the organic carbon source (and optionally the raw material of the kinetic carbon material), and form a cladding layer comprising the amorphous carbon on at least a partial surface of the artificial graphite.

In some embodiments, in S20, the carbonization duration is from 1 h to 6 h.

In some embodiments, the method for preparing a composite graphite material includes steps of: S10, providing a coke powder and a raw material powder of a kinetic carbon material, and mixing a binder with the coke powder and the raw material powder of the kinetic carbon material for granulation and then graphitization to obtain a bulk particle, where the bulk particle is a secondary particle formed by aggregation of more than two primary particles, and the bulk particle comprises artificial graphite; and S20, mixing the bulk particle with an organic carbon source, and forming a cladding layer comprising amorphous carbon on at least a partial surface of the bulk particle after carbonization, to obtain the composite graphite material.

In some embodiments, the method for preparing a composite graphite material, includes steps of: S10, providing a coke powder, mixing a binder with the coke powder for granulation and then graphitization to obtain a bulk particle, where the bulk particle is a secondary particle formed by aggregation of more than two primary particles, and the bulk particle comprises artificial graphite; and S20, mixing the bulk particle with an organic carbon source and a raw material powder of a kinetic carbon material, and forming a cladding layer comprising amorphous carbon on at least a partial surface of the bulk particle after carbonization, to obtain the composite graphite material.

In some embodiments, the method for preparing a composite graphite material includes steps of: S10, providing a coke powder and a raw material powder of a kinetic carbon material, and mixing a binder with the coke powder and the raw material powder of the kinetic carbon material for granulation and then graphitization to obtain a bulk particle, where the bulk particle is a secondary particle formed by aggregation of more than two primary particles, and the bulk particle comprises artificial graphite; and S20, mixing the bulk particle with an organic carbon source, and forming a cladding layer comprising amorphous carbon on at least a partial surface of the bulk particle after carbonization, to obtain the composite graphite material.

In the preparation method of the present application, the coke powder or the coke powder added with the raw material powder of the kinetic carbon material is graphitized to obtain the bulk particle, where the bulk particle is a secondary particle formed by aggregation of more than two primary particles. The coke powder obtained from crushing and shaping is mainly a single kind of particles. From the perspective of morphology, the coke powder is a primary particle; and the bulk particle obtained from granulation and graphitization of the coke powder or the coke powder added with raw material powder of the kinetic carbon material is an aggregate of a plurality of the primary particles. Therefore, from the perspective of morphology, the bulk particle is a secondary particle.

In the preparation method of the present application, composite graphite materials with different air oxidation temperatures $T_0$ can be obtained by adjusting, e.g., the volume average particle size Dv50 and the addition amount of the coke powder, the volume average particle size Dv50 and the addition amount of the raw material powder of the kinetic carbon material, the addition amount of the binder, and the addition amount of the organic carbon source.

Secondary Battery

Secondary battery, also known as a rechargeable battery or storage battery, refers to a battery that can be re-used by activating its active material by charging after the battery is discharged.

In general, the secondary battery comprises a positive electrode sheet, a negative electrode sheet, a separator, and an electrolyte. During charge-discharge of the battery, active ions are intercalated and deintercalated back and forth between the positive electrode sheet and the negative electrode sheet. The separator is arranged between the positive electrode sheet and the negative electrode sheet, mainly to serve for preventing short circuit between the positive and negative electrodes, and making the active ions pass through. The electrolyte serves for conducting the active ions between the positive electrode sheet and the negative electrode sheet.

[Negative Electrode Sheet]

In the secondary battery of the present application, the negative electrode sheet comprises a negative electrode current collector and a negative electrode film layer arranged on at least one surface of the negative electrode current collector. For example, the negative electrode current collector has two surfaces opposite in its own thickness direction, and the negative electrode film layer is arranged on either one or both of the two opposite surfaces of the negative electrode current collector.

A metal foil or a composite current collector may be used as the negative electrode current collector. As an example of the metal foil, a copper foil may be used. The composite current collector may comprise a polymer material substrate layer and a metal material layer formed on at least one surface of the polymer material substrate layer. As an example, the metal material may be selected from one or more of copper, copper alloy, nickel, nickel alloy, titanium, titanium alloy, silver, and silver alloy. As an example, the polymer material substrate layer may be selected from, e.g., polypropylene (PP), polyethylene terephthalate (PET), polybutylene terephthalate (PBT), polystyrene (PS), or polyethylene (PE).

The negative electrode film layer generally comprises a negative electrode active material, an optional binder, an optional conductive agent, and other optional adjuvants. The negative electrode film layer is generally formed by coating a negative electrode slurry on the negative electrode current collector, followed by drying and cold pressing. The negative electrode slurry is generally formed by dispersing the negative electrode active material, the optional conductive agent, the optional binder, and the other optional adjuvants in a solvent, and sufficiently stirring the mixture. The solvent may be, but is not limited to, N-methyl pyrrolidone (NMP) or deionized water.

In some embodiments, the negative electrode active material may include one of the composite graphite materials in the first aspect of the embodiments of the present application or the composite graphite material prepared in accordance with the method in the second aspect of the embodiments of the present application.

In some embodiments, the negative electrode active material may further include other negative electrode active materials for a secondary battery well-known in the art. As an example, other negative electrode active materials may include one or more of natural graphite, soft carbon, hard carbon, silicon-based material, tin-based material, or lithium titanate. The silicon-based material may include one or more of monatomic silicon, silicon oxides, silicon-carbon composites, silicon-nitrogen composites, or silicon alloy materials. The tin-based material may include one or more of monatomic tin, tin oxides, or tin alloy materials. In the present application, the negative electrode active material is not limited to these materials, and other conventional well-known materials usable for a negative electrode active material of a secondary battery may also be used. The other negative electrode active materials may be used alone or in combination of two or more.

In some embodiments, the conductive agent may include one or more of superconducting carbon, acetylene black, carbon black, Ketjen black, carbon dot, carbon nanotube, graphene, or carbon nanofiber. In some embodiments, the binder may include one or more of styrene butadiene rubber (SBR), water soluble unsaturated resin SR-1B, water-based acrylic acid resin (e.g., polyacrylic acid (PAA), polymethacrylic acid (PMAA), or sodium polyacrylate (PAAS)), polyacrylamide (PAM), polyvinyl alcohol (PVA), sodium alginate (SA), or carboxymethyl chitosan (CMCS). In some embodiments, the other optional adjuvants may include a thickener, e.g., sodium carboxymethyl cellulose (CMC-Na) or a PTC thermistor material.

In some embodiments, the negative electrode film layer may further comprise an additive. In this case, the additive, the composite graphite material, the optional conductive agent, the optional binder, and other optional adjuvants may be dispersed in the solvent, the mixture is sufficiently stirred to form a negative electrode slurry, and then the negative electrode slurry may be coated on the negative electrode current collector, to form the negative electrode film layer by drying and cold pressing. The additive is selected from one or more of hard carbon, micro-expanded graphite, expanded graphite, or graphene, and an interlayer distance $d_{002}$ between crystal planes of the additive (002) is greater than or equal to 0.3358 nm. These additives have favorable transport performance of the active ions and the electrons, and can enable the secondary battery to not only have a high energy density, but also have significantly improved fast charging performance and low-temperature power performance.

Optionally, gram capacity of the hard carbon under 1 V is more than or equal to 320 mAh/g, and a powder compaction density of the hard carbon under a force of 20,000N is greater than or equal to 1.05 g/cm$^3$.

Optionally, the additive is selected from one or more of micro-expanded graphite or expanded graphite. In particular, the additive is selected from expanded graphite.

Optionally, the interlayer distance $d_{002}$ between the crystal planes of the additive (002) is from 0.3359 nm to 0.3366 nm.

Optionally, a percentage mass content of the additive is from 1% to 20%, based on a total mass of the negative electrode film layer. For example, the percentage mass content of the additive is 1%-20%, 1%-18%, 1%-15%, 1%-12%, 1%-10%, 1%-8%, 1%-5%, 2%-20%, 2%-18%, 2%-15%, 2%-12%, 2%-10%, 2%-8%, 2%-5%, 3%-20%, 3%-18%, 3%-15%, 3%-12%, 3%-10%, 3%-8%, or 3%-5%. The percentage mass content of the additive within an appropriate range can enable the secondary battery to not only have a high energy density, but also have significantly improved fast charging performance and low-temperature power performance. Further, when the percentage mass content of the additive is within the appropriate range, the additive has a better ability to maintain a pore structure of the negative electrode film layer during cycles, the negative electrode sheet has better electrolyte solution wettability, and the secondary battery can further have favorable cycling performance.

In some embodiments, a surface density of the negative electrode film layer is from 0.035 kg/cm$^2$ to 0.125 kg/cm$^2$. Optionally, the surface density of the negative electrode film layer is from 0.078 kg/m$^2$ to 0.107 kg/m$^2$.

The surface density of the negative electrode film layer within the above range can enable the negative electrode sheet to not only have high reversible capacity, but also have a low transport impedance of the active ions and the electrons, thereby further improving the energy density, fast charging performance, low-temperature power performance, and cycling performance of the secondary battery.

In the present application, the surface density of the negative electrode film layer has a meaning well-known in the art, and may be determined using a method known in the art. For example, a single face coated and cold-pressed negative electrode sheet (a double face coated negative electrode sheet is also usable after wiping off the negative electrode film layer on one face thereof) is punched and cut into small wafers with an area of $S_1$, the weight of which are measured, and are denoted as $M_1$. Then, the negative electrode film layer of the weighed negative electrode sheet is wiped off; and the weight of the negative electrode current collector is measured, and is denoted as $M_0$. Surface density of negative electrode film layer=$(M_1-M_0)/S_1$.

In some embodiments, a compaction density of the negative electrode film layer is from 1.2 g/cm$^3$ to 1.75 g/cm$^3$. Optionally, the compaction density of the negative electrode film layer is from 1.4 g/m$^3$ to 1.6 g/m$_3$.

The compaction density of the negative electrode film layer within the above range can enable the negative electrode sheet to not only have high reversible capacity, but also have low cycling expansion and favorable dynamic performance, thereby further improving the energy density, fast charging performance, low-temperature power performance, and cycling performance of the secondary battery.

In the present application, the compaction density of the negative electrode film layer has a meaning well-known in the art, and may be determined using a method known in the art. Compaction density of negative electrode film layer=surface density of negative electrode film layer/thickness of negative electrode film layer. In the present application, the thickness of the negative electrode film layer has a meaning well-known in the art, and may be determined using a method known in the art, for example, using a screw micrometer with 4-digit precision.

In some embodiments, a porosity of the negative electrode film layer is from 25% to 45%. Optionally, the porosity of the negative electrode film layer is from 28% to 35%.

The porosity of the negative electrode film layer within the above range can enable the negative electrode sheet to have appropriate electrolyte solution wettability and favorable reaction interface, and can improve the charge-discharge performance of the negative electrode at a large rate, thereby improving the fast charging performance of the secondary battery. Further, the negative electrode film layer can further have appropriate electrolyte solution retention, thereby making the secondary battery have a light weight, and contributing to making the secondary battery have a high mass energy density.

In the present application, the porosity of the negative electrode film layer has a meaning well-known in the art, and may be determined using a method known in the art, for example, using a gas replacement method by referring to GB/T24586-2009. The test method is as follows: a single face coated and cold-pressed negative electrode sheet (a double face coated negative electrode sheet is also usable after wiping off the negative electrode film layer on one face thereof) is punched and cut into small wafer samples with a diameter of 14 mm; thickness of the negative electrode film layer is tested (thickness of negative electrode sheet-thickness of negative electrode current collector); an apparent volume $V_1$ of the negative electrode film layer is computed in accordance with a cylinder volume computing equation; a real volume of the negative electrode sheet is measured with an inert gas, such as helium or nitrogen, as a medium, using the gas replacement method, and using a real density tester (such as Micromerics AccuPyc II 1340) by referring to GB/T 24586-2009; and a real volume $V_2$ of the negative electrode film layer is obtained by subtracting the volume of the negative electrode current collector from the real volume of the negative electrode sheet. Porosity of negative electrode film layer=$(V_1-V_2)/V_1 \times 100\%$. A plurality of (e.g., 30) negative electrode sheet samples may be tested, and an average value of the results may be taken to improve the accuracy of the test results.

In some embodiments, a binding force between the negative electrode film layer and the negative electrode current collector is from 4.5 N/m to 15 N/m. Optionally, the binding force between the negative electrode film layer and the negative electrode current collector is from 8 N/m to 12 N/m.

The binding force between the negative electrode film layer and the negative electrode current collector within the above range can improve the fast charging performance and cycling performance of the secondary battery. A large binding force between the negative electrode film layer and the negative electrode current collector enables the negative electrode sheet to have favorable electronic conductivity, thereby contributing to improving the intercalation speed of active ions. Further, the binding force between the negative electrode film layer and the negative electrode current collector further reflects the ability of the negative electrode sheet to maintain the binding reliability during cycles, and contributes to maintaining favorable electronic conductivity of the secondary battery in the full life cycle, thereby further improving the cycling performance of the secondary battery.

In the present application, the binding force between the negative electrode film layer and the negative electrode current collector has a meaning well-known in the art, and may be determined using a method known in the art. An example test method is as follows: the negative electrode sheet is cut into a test sample with a length of 100 mm and a width of 10 mm; a double-faced adhesive tape (width: 11 mm) is pasted on a stainless steel plate with a width of 25 mm, such that the test sample is pasted on the double-faced adhesive tape on the stainless steel plate, and is rolled back and forth on a surface thereof with a 2000 g pressing roller three times (300 mm/min); the test sample is bent 180 degrees, to manually peel off 25 mm of the negative electrode film layer of the test sample from the negative electrode current collector, the test sample is fixed on a test machine (e.g., INSTRON 336) in such a way that a peeling surface is consistent with a force line of the test machine, the test machine continuously peels off the negative electrode film layer at 30 mm/min to obtain a peeling force curve, and an average value of a steady segment is used as the peeling force $F_0$. Binding force between negative electrode film layer and negative electrode current collector=$F_0$/width of test sample.

In the present application, relevant parameters of the negative electrode film layer refer to parameters of a single-faced negative electrode film layer. That is, when the negative electrode film layer is arranged on two surfaces of the negative electrode current collector, and parameters of the negative electrode film layer on any one of the surfaces is included within the parameter range of the present application, it is considered that the negative electrode film layer is encompassed within the scope of protection of the present application.

In the secondary battery of the present application, the negative electrode sheet does not exclude other additional functional layers except for the negative electrode film layer. For example, in some embodiments, the negative electrode sheet in the present application further includes a conductive priming coat (e.g., composed of a conductive agent and a binder) sandwiched between the negative electrode current collector and the negative electrode film layer and arranged on the surface of the negative electrode current collector. In some other embodiments, the negative electrode sheet in the present application further comprises a protective layer covering a surface of the negative electrode film layer.

[Positive Electrode Sheet]

In the secondary battery of the present application, the positive electrode sheet comprises a positive electrode current collector and a positive electrode film layer arranged on at least one surface of the positive electrode current collector and comprising a positive electrode active material. For example, the positive electrode current collector has two surfaces opposite in its own thickness direction, and the positive electrode film layer is arranged on either one or both of the two opposite surfaces of the positive electrode current collector.

In the secondary battery of the present application, a positive electrode active material for a secondary battery well-known in the art may be used as the positive electrode active material. For example, the positive electrode active material may comprise one or more of lithium transition metal oxides, olivine-structured lithium-containing phosphates, and respective modified compounds thereof. Examples of lithium transition metal oxides may include, but are not limited to, one or more of lithium-cobalt oxides, lithium-nickel oxides, lithium-manganese oxides, lithium-nickel-cobalt oxides, lithium-manganese-cobalt oxides, lithium-nickel-manganese oxides, lithium-nickel-cobalt-manganese oxides, lithium-nickel-cobalt-aluminum oxides, and modified compounds thereof. Examples of olivine-structured lithium-containing phosphates may include, but are not limited to, one or more of lithium iron phosphate, lithium iron phosphate and carbon composite, lithium manganese phosphate, lithium manganese phosphate and carbon composite, lithium manganese iron phosphate, lithium manganese iron phosphate and carbon composite, and respective modified compounds thereof. In the present application, the positive electrode active material is not limited to these materials, and other conventional well-known materials usable for a positive electrode active material of a secondary battery may also be used.

In some embodiments, in order to further improve the energy density of the secondary battery, the positive electrode active material may comprise one or more of lithium transition metal oxides shown in formula 1 and modified compounds thereof, $$Li_a Ni_b CO_c M_d O_e A_f \qquad \text{formula 1,}$$

in formula 1, $0.8 \leq a \leq 1.2$, $0.5 \leq b < 1$, $0 < c < 1$, $0 < d < 1$, $1 \leq e \leq 2$, $0 \leq f \leq 1$, M is selected from one or more of Mn, Al, Zr, Zn, Cu, Cr, Mg, Fe, V, Ti, and B, and A is selected from one or more of N, F, S, and Cl.

In the present application, the modified compounds of the above materials may be obtained by doping modification or surface coating modification of the positive electrode active material.

In the secondary battery of the present application, the positive electrode film layer generally comprises a positive electrode active material, an optional binder, and an optional conductive agent. The positive electrode film layer is usually formed by coating a positive electrode slurry on the positive electrode current collector, followed by drying and cold pressing. The positive electrode slurry is generally formed by dispersing the positive electrode active material, the optional conductive agent, the optional binder and any other components in a solvent and sufficiently stirring the mixture. The solvent may be, but is not limited to, N-methyl pyrrolidone (NMP). As an example, the binder used for the positive electrode film layer may comprise one or more of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, or fluoroacrylate resin.

In the secondary battery of the present application, a metal foil or a composite current collector may be used as the positive electrode current collector. As an example of the metal foil, an aluminum foil may be used. The composite current collector may comprise a polymer material substrate layer and a metal material layer formed on at least one surface of the polymer material substrate layer. As an example, the metal material may be selected from one or more of aluminum, aluminum alloy, nickel, nickel alloy, titanium, titanium alloy, silver, or silver alloy. As an example, the polymer material substrate layer may be selected from, e.g., polypropylene (PP), polyethylene tere-phthalate (PET), polybutylene terephthalate (PBT), polysty-rene (PS), or polyethylene (PE).

[Electrolyte]

Types of electrolytes are not specifically limited for the secondary battery of the present application, and may be selected as required. For example, the electrolyte may be selected from at least one of a solid electrolyte and a liquid electrolyte (i.e., an electrolyte solution).

In some embodiments, an electrolyte solution is used as the electrolyte. The electrolyte solution comprises an elec-trolyte salt and a solvent.

Types of electrolyte salts are not specifically limited in the present application, and may be selected as required. In some embodiments, as an example, the electrolyte salt may be selected from one or more of lithium hexafluorophos-phate ($LiPF_6$), lithium tetrafluoroborate ($LiBF_4$), lithium perchlorate ($LiClO_4$), lithium hexafluoroarsenate ($LiAsF_6$), lithium bis(fluorosulfonyl)imide (LiFSI), lithium bis(trifluo-romethanesulfonyl)imide (LiTFSI), lithium trifluorometh-anesulfonate (LiTFS), lithium difluoro(oxalato)borate (LiD-FOB), lithium bis(oxalate)borate (LiBOB), lithium difluorophosphate ($LiPO_2F_2$), lithium difluoro bis(oxalato) phosphate (LiDFOP), and lithium tetrafluoro(oxalato)phos-phate (LiTFOP).

Types of solvents are not specifically limited in the present application, and may be selected as required. In some embodiments, as an example, the solvent may be selected from one or more of ethylene carbonate (EC), propylene carbonate (PC), ethyl methyl carbonate (EMC), diethyl carbonate (DEC), dimethyl carbonate (DMC), dipro-pyl carbonate (DPC), methyl propyl carbonate (MPC), ethyl propyl carbonate (EPC), butylene carbonate (BC), fluoro-ethylene carbonate (FEC), methyl formate (MF), methyl acetate (MA), ethyl acetate (EA), propyl acetate (PA), methyl propionate (MP), ethyl propionate (EP), propyl pro-pionate (PP), methyl butyrate (MB), ethyl butyrate (EB), 1,4-butyrolactone (GBL), sulfolane (SF), dimethyl sulfone (MSM), methyl ethyl sulfone (EMS), and diethyl sulfone (ESE).

In some embodiments, the electrolyte solution further optionally comprises an additive. For example, the additive may include a negative electrode film-forming additive, or may include a positive electrode film-forming additive, or may further include an additive that can improve some performance of the battery, such as an additive that improves overcharge performance of the battery, an additive that improves high-temperature performance of the battery, or an additive that improves low-temperature power performance of the battery.

[Separator]

The secondary battery using an electrolyte solution and some secondary batteries using a solid electrolyte further include a separator. The separator is arranged between the positive electrode sheet and the negative electrode sheet and functions to separate. Types of separators are not particularly limited in the present application, and may be any well-known separator with good chemical stability, good mechanical stability, and a porous structure. In some embodiments, the material of the separator may be selected from one or more of glass fiber, non-woven cloth, polyeth-ylene, polypropylene, and polyvinylidene fluoride. The separator may be a single-layer film, or may be a multilayer composite film. When the separator is a multilayer compos-ite film, the materials in each layer may be identical or different.

In some embodiments, the positive electrode sheet, the separator, and the negative electrode sheet may be made into an electrode assembly by a winding process or a stacking process.

In some embodiments, the secondary battery may com-prise an outer package. The outer package can be used to encapsulate the above-mentioned electrode assembly and electrolyte.

In some embodiments, the outer package of the secondary battery may be a hard case, such as a hard plastic case, an aluminum case, a steel case, and the like. The outer package of the secondary battery can also be a soft pack, such as a bag-type soft pack. The material of the soft pack may be plastic, e.g., one or more of polypropylene (PP), polybuty-lene terephthalate (PBT), or polybutylene succinate (PBS).

Figure 4:
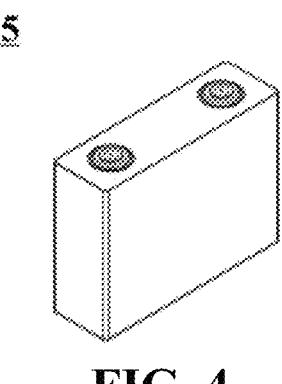
FIG. 4 is a schematic diagram of a secondary battery in an embodiment of the present application.

Shapes of secondary batteries are not particularly limited in the present application, and may be cylindrical, square, or any other shape. For example, FIG. 4 is a square-structured secondary battery 5 as an example.

Figure 5:
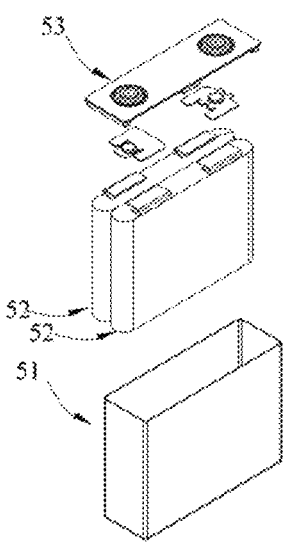
FIG. 5 is a schematic exploded view of the secondary battery in an embodiment of the present application.

In some embodiments, referring to FIG. 5, the outer package may comprise a case 51 and a cover plate 53. The case 51 may comprise a bottom plate and a side plate connected to the bottom plate, which enclose to form an accommodating cavity. The case 51 has an opening that communicates with the accommodating cavity, and the cover plate 53 is used to cover the opening to close the accommodating cavity. The positive electrode sheet, the negative electrode sheet, and the separator may be formed into an electrode assembly 52 by a winding process or a stacking process. The electrode assembly 52 is encapsulated within the accommodating cavity. The electrolyte solution impregnates the electrode assembly 52. The number of electrode assemblies 52 contained in the secondary battery 5 can be one or more, and can be adjusted according to requirements.

In some embodiments, the secondary batteries may be assembled into a battery module, the number of secondary batteries comprised in the battery module may be a plural number, and the specific number may be adjusted based on the application and capacity of the battery module.

Figure 6:
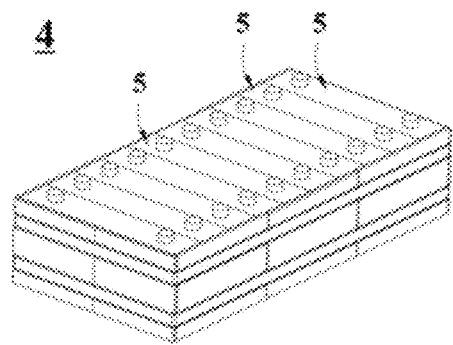
FIG. 6 is a schematic diagram of a battery module in an embodiment of the present application.

FIG. 6 is a battery module 4 as an example. Referring to FIG. 6, in the battery module 4, a plurality of secondary batteries 5 can be sequentially arranged along the length direction of the battery module 4. Of course, any other arrangement is also possible. The plurality of secondary batteries 5 may further be fixed by fasteners.

Optionally, the battery module 4 can further include a case having an accommodating space, in which the plurality of secondary batteries 5 are accommodated.

In some embodiments, the battery module may be further assembled into a battery pack, and the number of battery modules comprised in the battery pack may be adjusted based on the application and capacity of the battery pack.

Figure 7:
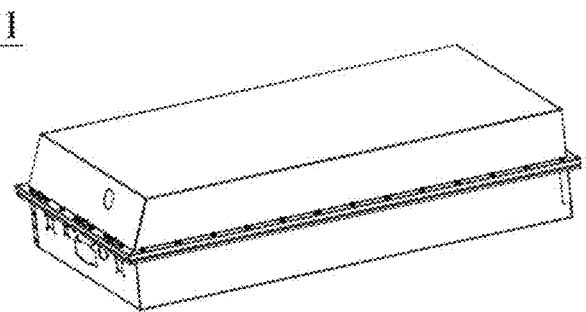
FIG. 7 is a schematic diagram of a battery pack in an embodiment of the present application.
Figure 8:
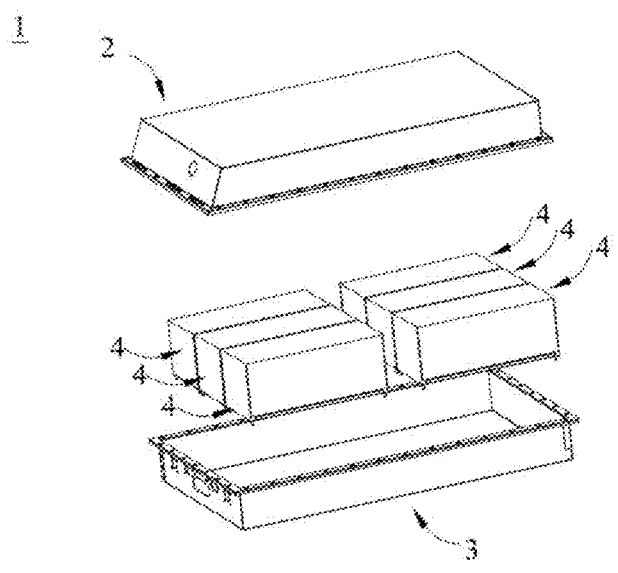
FIG. 8 is an exploded view of FIG. 4.

FIG. 7 and FIG. 8 are a battery pack 1 as an example. Referring to FIG. 7 and FIG. 8, the battery pack 1 may comprise a battery box and a plurality of battery modules 4 arranged in the battery box. The battery box comprises an upper box 2 and a lower box 3. The upper box 2 is configured to cover the lower box 3 and form an enclosed space for accommodating the battery module 4. The plurality of battery modules 4 may be arranged in the battery box in any manner.

The method for preparing a secondary battery in the present application is well-known. In some embodiments, the positive electrode sheet, the separator, the negative electrode sheet, and the electrolyte solution may be assembled to form a secondary battery. As an example, the positive electrode sheet, the separator, and the negative electrode sheet may be made into an electrode assembly by a winding process or a stacking process. The electrode assembly is placed in the outer package, and oven dried, the electrolyte solution is injected therein, and the secondary battery is obtained through the processes, such as vacuum encapsulation, standing, formation, and shaping.

Electrical Apparatus

An embodiment of the present application further provides an electrical apparatus. The electrical apparatus comprises at least one of the secondary batteries, the battery module, or the battery pack in the present application. The secondary battery, the battery module, or the battery pack may be used as a power source of the electrical apparatus, or may be used as an energy storage unit of the electrical apparatus. The electrical apparatus may be, but is not limited to, a mobile device (such as a mobile phone or a laptop), an electric vehicle (such as an all-electric vehicle, a hybrid electric vehicle, a plug-in hybrid electric vehicle, an electric bicycle, an electric scooter, an electric golf cart, an electric truck), an electric train, a ship, a satellite, an energy storage system, etc.

The secondary battery, the battery module, or the battery pack may be selected for the electrical apparatus based on use demand thereof.

Figure 9:
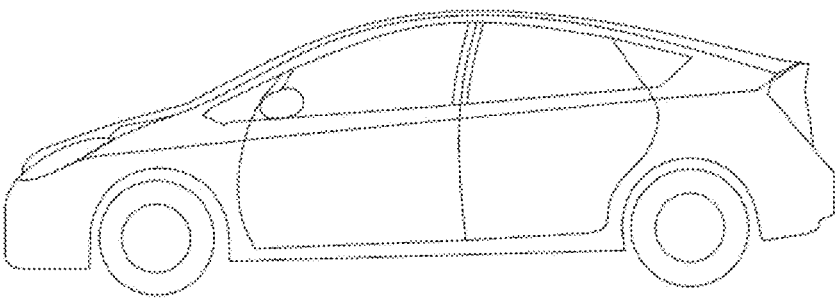
FIG. 9 is a schematic diagram of an electrical apparatus using the secondary battery in the present application as a power source in an embodiment.

FIG. 9 is an electrical apparatus as an example. The electrical apparatus is, e.g., an all-electric vehicle, a hybrid electric vehicle, or a plug-in hybrid electric vehicle. In order to meet the requirements of the electrical apparatus for high power and high energy density, a battery pack or a battery module may be used.

As another example, the electrical apparatus may be a mobile phone, a tablet, a laptop, etc. The electrical apparatus is generally required to be light and thin, in which a secondary battery may be used as a power source.

EXAMPLES

The following examples describe the disclosure of the present application in more detail and are provided for illustrative purposes only, as various modifications and changes within the scope of the disclosure of the present application will be apparent to those skilled in the art. Unless otherwise stated, all parts, percentages, and ratios reported in the following examples are on a weight basis, and all reagents used in the examples are commercially available or can be obtained by synthesis according to conventional methods, and can be directly used without further treatment, and the instruments used in the examples are commercially available.

Example 1

Method for Preparing a Composite Graphite Material

Raw coke of petroleum non-needle coke was obtained by delayed coking of petroleum residue at 490° C.-510° C.; and the raw coke was crushed, shaped, and graded to obtain a coke powder with a volume average particle size Dv50 of 9.5 μm, for use as a main raw material of the composite graphite material.

Micro-expanded graphite with an interlayer distance $d_{002}$ of 0.3363 nm (expansion multiple: 180) was crushed, shaped, and graded to obtain a micro-expanded graphite powder with a volume average particle size Dv50 of 7.5 μm.

The coke powder and the micro-expanded graphite powder were mixed, and then mixed with a binder coal asphalt. Then, the mixture was granulated. A volume average particle size Dv50 of particles obtained from the granulation was about 131 μm. The granulation product was placed in a graphite crucible, and then the graphite crucible was placed in an Acheson furnace. A resistance material was filled around the graphite crucible, and was powered on, such that a current flowed through the resistance material to generate heat energy. A bulk particle was obtained by graphitization at about 3,000° C.

The resulting bulk particle was mixed with an organic carbon source petroleum asphalt, and then the mixture was carbonized in a rail kiln, where a highest temperature region was about 1150° C., and run time in the highest temperature region was about 4 h, so as to form a cladding layer on at least a partial surface of the bulk particle, and obtain the composite graphite material.

Based on a total mass of the resulting composite graphite material, a percentage mass content of the added micro-expanded graphite powder was 1%, a percentage mass content of added binder was 6%, and mass of the added organic carbon source was such that a percentage mass content of amorphous carbon obtained from carbonization of the organic carbon source was 3%.

Preparation of a Negative Electrode Sheet

The composite graphite material prepared above (as a negative electrode active material), a binder styrene butadiene rubber (SBR), a thickener sodium carboxymethyl cellulose (CMC-Na), and a conductive agent carbon black (Super P) at a weight ratio of 96.2:1.8:1.2:0.8 were sufficiently stirred and mixed in an appropriate amount of solvent deionized water, to form a homogeneous negative electrode slurry. The negative electrode slurry was homogeneously coated on a surface of a negative electrode current collector copper foil, dried, and cold pressed to obtain the negative electrode sheet. A surface density of the negative electrode film layer was 0.097 kg/m², and a compaction density of the negative electrode film layer was 1.64 g/m³.

Preparation of a Positive Electrode Sheet

A positive electrode active material $LiNi_{0.5}Co_{0.2}Mn_{0.3}O_2$ (NCM523), a conductive agent carbon nanotube (CNT), a conductive agent carbon black (Super P), and a binder polyvinylidene fluoride (PVDF) were sufficiently stirred and mixed in an appropriate amount of solvent NMP at a weight ratio of 97.5:0.5:0.9:1.1, to form a homogeneous positive electrode slurry. The positive electrode slurry was homogeneously coated on a surface of a positive electrode current collector aluminum foil, dried, and cold pressed to obtain the positive electrode sheet. A surface density of the positive electrode film layer was 0.178 kg/m$^2$, and a compaction density of the positive electrode film layer was 3.4 g/m$^3$.

Separator

A porous polyethylene (PE) film was used as the separator.

Preparation of an Electrolyte Solution

Ethylene carbonate (EC), ethyl methyl carbonate (EMC), and diethyl carbonate (DEC) at a volume ratio of 1:1:1 were mixed, to obtain an organic solvent; and then LiPF$_6$ was sufficiently dissolved in the above organic solvent to obtain the electrolyte solution with a concentration of LiPF$_6$ being 1 mol/L.

Preparation of a Secondary Battery

The positive electrode sheet, the separator, and the negative electrode sheet were stacked sequentially, and winded to obtain an electrode assembly. The electrode assembly was placed in an outer package, into which the electrolyte solution was added, and the secondary battery was obtained through the processes, such as encapsulation, standing, formation, and aging.

Example 2

The method for preparing a secondary battery is similar to that in Example 1, except that, based on the total mass of the resulting composite graphite material, the percentage mass content of the added micro-expanded graphite powder is 3%, the percentage mass content of the added binder is 6%, and the mass of the added organic carbon source is such that a percentage mass content of amorphous carbon obtained from carbonization of the organic carbon source is 3%.

Example 3

The method for preparing a secondary battery is similar to that in Example 1, except that, based on the total mass of the resulting composite graphite material, the percentage mass content of the added micro-expanded graphite powder is 8%, the percentage mass content of the added binder is 6%, and the mass of the added organic carbon source is such that a percentage mass content of amorphous carbon obtained from carbonization of the organic carbon source is 3%.

Example 4

The method for preparing a secondary battery is similar to that in Example 1, except that, based on the total mass of the resulting composite graphite material, the percentage mass content of the added micro-expanded graphite powder is 12%, the percentage mass content of the added binder is 6%, and the mass of the added organic carbon source is such that a percentage mass content of amorphous carbon obtained from carbonization of the organic carbon source is 3%.

Example 5

The method for preparing a secondary battery is similar to that in Example 1, except that, based on the total mass of the resulting composite graphite material, the percentage mass content of the added micro-expanded graphite powder is 20%, the percentage mass content of the added binder is 6%, and the mass of the added organic carbon source is such that a percentage mass content of amorphous carbon obtained from carbonization of the organic carbon source is 3%.

Example 6

The method for preparing a secondary battery is similar to that in Example 1, except that, based on the total mass of the resulting composite graphite material, the percentage mass content of the added micro-expanded graphite powder is 30%, the percentage mass content of the added binder is 6%, and the mass of the added organic carbon source is such that a percentage mass content of amorphous carbon obtained from carbonization of the organic carbon source is 3%.

Example 7

The method for preparing a secondary battery is similar to that in Example 3, except that the micro-expanded graphite powder is replaced with a hard carbon powder with an interlayer distance d$_{002}$ of 0.33615 nm and with a volume average particle size Dv50 of 5.3 μm.

Example 8

The method for preparing a secondary battery is similar to that in Example 3, except that the micro-expanded graphite powder is replaced with an expanded graphite powder (expansion multiple: 300) with an interlayer distance d$_{002}$ of 0.33638 nm and with a volume average particle size Dv50 of 7.2 μm.

Example 9

The method for preparing a secondary battery is similar to that in Example 3, except that the micro-expanded graphite powder is replaced with a graphene powder with an interlayer distance d$_{002}$ of 0.33620 nm and with a volume average particle size Dv50 of 8.0 μm.

Example 10

The method for preparing a secondary battery is similar to that in Example 1, except that the composite graphite material was prepared in accordance with the following method.

Raw coke of petroleum non-needle coke was obtained by delayed coking of petroleum residue at 490° C.-510° C.; and the raw coke was crushed, shaped, and graded to obtain a coke powder with a volume average particle size Dv50 of 9.5 μm, for use as a main raw material of the composite graphite material.

Micro-expanded graphite with an interlayer distance d$_{002}$ of 0.3363 nm (expansion multiple: 180) was crushed, shaped, and graded to obtain a micro-expanded graphite powder with a volume average particle size Dv50 of 7.5 μm.

A coke powder and a binder coal asphalt were mixed, and then the mixture was granulated. A volume average particle size Dv50 of particles obtained from the granulation was about 13 μm. The granulation product was placed in a graphite crucible, and then the graphite crucible was placed in an Acheson furnace. A resistance material was filled around the graphite crucible, and was powered on, such that a current flowed through the resistance material to generate heat energy. A bulk particle was obtained by graphitization at about 3,000° C.

The resulting bulk particle was mixed with a micro-expanded graphite powder and an organic carbon source petroleum asphalt, and then the mixture was carbonized in a rail kiln, where a highest temperature region was about 1150° C., and run time in the highest temperature region was about 4 h, so as to form a cladding layer on at least a partial surface of the bulk particle, and obtain the composite graphite material.

Based on a total mass of the resulting composite graphite material, a percentage mass content of the added micro-expanded graphite powder is 8%, a percentage mass content of added binder is 6%, and mass of the added organic carbon source is such that a percentage mass content of amorphous carbon obtained from carbonization of the organic carbon source is 3%.

Example 11

The method for preparing a secondary battery is similar to that in Example 1, except that the composite graphite material was prepared in accordance with the following method.

Raw coke of petroleum non-needle coke was obtained by delayed coking of petroleum residue at 490° C.-510° C.; and the raw coke was crushed, shaped, and graded to obtain a coke powder with a volume average particle size Dv50 of 9.5 μm, for use as a main raw material of the composite graphite material.

Micro-expanded graphite with an interlayer distance $d_{002}$ of 0.3363 nm (expansion multiple: 180) was crushed, shaped, and graded to obtain a micro-expanded graphite powder with a volume average particle size Dv50 of 7.5 μm.

The coke powder and the micro-expanded graphite powder were mixed, and then mixed with a binder coal asphalt. Then, the mixture was granulated. A volume average particle size Dv50 of particles obtained from the granulation was about 13 μm. The granulation product was placed in a graphite crucible, and then the graphite crucible was placed in an Acheson furnace. A resistance material was filled around the graphite crucible, and was powered on, such that a current flowed through the resistance material to generate heat energy. A bulk particle was obtained by graphitization at about 3,000° C.

The resulting bulk particle was mixed with a micro-expanded graphite powder and an organic carbon source petroleum asphalt, and then the mixture was carbonized in a rail kiln, where a highest temperature region was about 1150° C., and run time in the highest temperature region was about 4 h, so as to form a cladding layer on at least a partial surface of the bulk particle, and obtain the composite graphite material.

Based on a total mass of the resulting composite graphite material, a total percentage mass content of the micro-expanded graphite powder added twice is 10%, a percentage mass content of added binder is 6%, and mass of the added organic carbon source is such that a percentage mass content of amorphous carbon obtained from carbonization of the organic carbon source is 3%.

Example 12

The method for preparing a secondary battery is similar to that in Example 3, except that the negative electrode sheet was prepared in accordance with the following method.

The composite graphite material prepared above (as a negative electrode active material), a binder styrene butadiene rubber (SBR), a thickener sodium carboxymethyl cellulose (CMC-Na), and a conductive agent carbon black (Super P) at a weight ratio of 96.2:1.8:1.2:0.8 were mixed, then the mixture was mixed with the above micro-expanded graphite powder at a mass ratio of 96:4, an appropriate amount of solvent deionized water was added, and the mixture was sufficiently stirred and mixed, to form a homogeneous negative electrode slurry. The negative electrode slurry was homogeneously coated on a surface of a negative electrode current collector copper foil, dried, and cold pressed to obtain the negative electrode sheet.

Example 13

The method for preparing a secondary battery is similar to that in Example 10, except that the negative electrode sheet was prepared in accordance with the following method.

The composite graphite material prepared above (as a negative electrode active material), a binder styrene butadiene rubber (SBR), a thickener sodium carboxymethyl cellulose (CMC-Na), and a conductive agent carbon black (Super P) at a weight ratio of 96.2:1.8:1.2:0.8 were mixed, then the mixture was mixed with the above micro-expanded graphite powder at a mass ratio of 96:4, an appropriate amount of solvent deionized water was added, and the mixture was sufficiently stirred and mixed, to form a homogeneous negative electrode slurry. The negative electrode slurry was homogeneously coated on a surface of a negative electrode current collector copper foil, dried, and cold pressed to obtain the negative electrode sheet.

Example 14

The method for preparing a secondary battery is similar to that in Example 11, except that the negative electrode sheet was prepared in accordance with the following method.

The composite graphite material prepared above (as a negative electrode active material), a binder styrene butadiene rubber (SBR), a thickener sodium carboxymethyl cellulose (CMC-Na), and a conductive agent carbon black (Super P) at a weight ratio of 96.2:1.8:1.2:0.8 were mixed, then the mixture was mixed with the above micro-expanded graphite powder at a mass ratio of 96:4, an appropriate amount of solvent deionized water was added, and the mixture was sufficiently stirred and mixed, to form a homogeneous negative electrode slurry. The negative electrode slurry was homogeneously coated on a surface of a negative electrode current collector copper foil, dried, and cold pressed to obtain the negative electrode sheet.

Example 15

The method for preparing a secondary battery is similar to that in Example 1, except that the composite graphite material was prepared in accordance with the following method.

Raw coke of petroleum non-needle coke was obtained by delayed coking of petroleum residue at 490° C.-510° C.; and the raw coke was crushed, shaped, and graded to obtain a coke powder with a volume average particle size Dv50 of 7.0 μm, for use as a main raw material of the composite graphite material.

Micro-expanded graphite with an interlayer distance $d_{002}$ of 0.3363 nm (expansion multiple: 180) was crushed, shaped, and graded to obtain a micro-expanded graphite powder with a volume average particle size Dv50 of 6.5 μm.

The coke powder and the micro-expanded graphite powder were mixed, and then mixed with a binder coal asphalt.

Then, the mixture was granulated. A volume average particle size Dv50 of particles obtained from the granulation was about 9 μm. The granulation product was placed in a graphite crucible, and then the graphite crucible was placed in an Acheson furnace. A resistance material was filled around the graphite crucible, and was powered on, such that a current flowed through the resistance material to generate heat energy. A bulk particle was obtained by graphitization at about 3,000° C.

The resulting bulk particle was mixed with an organic carbon source petroleum asphalt, and then the mixture was carbonized in a rail kiln, where a highest temperature region was about 1150° C., and run time in the highest temperature region was about 4 h, so as to form a cladding layer on at least a partial surface of the bulk particle, and obtain the composite graphite material.

Based on a total mass of the resulting composite graphite material, a percentage mass content of the added micro-expanded graphite powder is 20%, a percentage mass content of added binder is 6%, and mass of the added organic carbon source is such that a percentage mass content of amorphous carbon obtained from carbonization of the organic carbon source is 3%.

Example 16

The method for preparing a secondary battery is similar to that in Example 1, except that the composite graphite material was prepared in accordance with the following method.

Raw coke of petroleum non-needle coke was obtained by delayed coking of petroleum residue at 490° C.-510° C.; and the raw coke was crushed, shaped, and graded to obtain a coke powder with a volume average particle size Dv50 of 11.5 μm, for use as a main raw material of the composite graphite material.

Micro-expanded graphite with an interlayer distance $d_{002}$ of 0.3363 nm (expansion multiple: 180) was crushed, shaped, and graded to obtain a micro-expanded graphite powder with a volume average particle size Dv50 of 7.5 μm.

The coke powder and the micro-expanded graphite powder were mixed, and then mixed with a binder coal asphalt. Then, the mixture was granulated. A volume average particle size Dv50 of particles obtained from the granulation was about 14.5 μm. The granulation product was placed in a graphite crucible, and then the graphite crucible was placed in an Acheson furnace. A resistance material was filled around the graphite crucible, and was powered on, such that a current flowed through the resistance material to generate heat energy. A bulk particle was obtained by graphitization at about 3,000° C.

The resulting bulk particle was mixed with an organic carbon source petroleum asphalt, and then the mixture was carbonized in a rail kiln, where a highest temperature region was about 1150° C., and run time in the highest temperature region was about 4 h, so as to form a cladding layer on at least a partial surface of the bulk particle, and obtain the composite graphite material.

Based on a total mass of the resulting composite graphite material, a percentage mass content of the added micro-expanded graphite powder was 1%, a percentage mass content of added binder was 6%, and mass of the added organic carbon source was such that a percentage mass content of amorphous carbon obtained from carbonization of the organic carbon source was 3%.

Comparative Example 1

The method for preparing a secondary battery is similar to that in Example 1, except that conventional artificial graphite without a cladding layer is used as the negative electrode active material. The artificial graphite was prepared in accordance with the following method.

Raw coke of petroleum non-needle coke was obtained by delayed coking of petroleum residue at 490° C.-510° C.; and the raw coke was crushed, shaped, and graded to obtain a coke powder with a volume average particle size Dv50 of 9.5 μm.

A coke powder and a binder coal asphalt were mixed, and then the mixture was granulated. A volume average particle size Dv50 of particles obtained from the granulation was about 13 μm. The granulation product was placed in a graphite crucible, and then the graphite crucible was placed in an Acheson furnace. A resistance material was filled around the graphite crucible, and was powered on, such that a current flowed through the resistance material to generate heat energy. The artificial graphite was obtained by graphitization at about 3,000° C. A percentage mass content of the binder is 6% based on the total mass of the resulting artificial graphite.

Comparative Example 2

The method for preparing a secondary battery is similar to that in Example 1, except that the composite graphite material was prepared in accordance with the following method.

Raw coke of petroleum non-needle coke was obtained by delayed coking of petroleum residue at 490° C.-510° C.; and the raw coke was crushed, shaped, and graded to obtain a coke powder with a volume average particle size Dv50 of 9.5 μm, for use as a main raw material of the composite graphite material.

A coke powder and a binder coal asphalt were mixed, and then the mixture was granulated. A volume average particle size Dv50 of particles obtained from the granulation was about 13 μm. The granulation product was placed in a graphite crucible, and then the graphite crucible was placed in an Acheson furnace. A resistance material was filled around the graphite crucible, and was powered on, such that a current flowed through the resistance material to generate heat energy. A bulk particle was obtained by graphitization at about 3,000° C.

The resulting bulk particle was mixed with an organic carbon source petroleum asphalt, and then the mixture was carbonized in a rail kiln, where a highest temperature region was about 1150° C., and run time in the highest temperature region was about 4 h, so as to form a cladding layer on at least a partial surface of the bulk particle, and obtain the composite graphite material.

Based on a total mass of the resulting composite graphite material, a percentage mass content of the added binder is 6%, and mass of the added organic carbon source is such that a percentage mass content of amorphous carbon obtained from carbonization of the organic carbon source is 3%.

Test

The Dv50 and the powder compaction density of the negative electrode active material, and the compaction density of the negative electrode film layer were tested in accordance with the above method disclosed in the specification.

(1) Test of the Air Oxidation Temperature $T_0$ of the Composite Graphite Material The composite graphite material was tested for the air oxidation temperature using Netzsch STA 449 $F_3$ simultaneous thermal analyzer. First, 10±0.05 mg of the composite graphite material sample was weighed, and was placed in a flat-bottomed $Al_2O_3$ crucible, which was not covered; and instrument parameters were set as follows: purge gas: air at a gas flow rate set as 60 mL/min, protective gas: nitrogen at a gas flow rate set as 20 mL/min; heating rate: 5° C./min, and a test temperature ranging from 35° C. to 950° C. When the temperature was lower than 500° C., because there was no characteristic peak at this stage, the composite graphite material may be fast heated, for example, at a heating rate set as 10° C./min.

A thermogravimetric curve (TG) and a differential thermogravimetric curve (DTG) were obtained after thermogravimetric test was completed, a peak temperature $T_1$ of a peak with a largest area was read from the differential thermogravimetric curve, and an intersection of two tangents at two points corresponding to 500° C. and the temperature $T_1$ respectively was determined on the thermogravimetric curve, where a temperature corresponding to the intersection on the thermogravimetric curve was the air oxidation temperature $T_0$ of the composite graphite material.

(2) Test of the Gram Capacity of the Composite Graphite Material

The composite graphite material, the conductive agent carbon black (SuperP), and the binder polyvinylidene fluoride (PVDF) at a mass ratio of 91.6:1.8:6.6 were sufficiently mixed in a solvent N-methyl pyrrolidone (NMP) to prepare a slurry; and the resulting slurry was coated on a copper foil current collector, and was dried in a drying oven for later use. A metal lithium sheet was used as a counter electrode and a polyethylene (PE) film was used as a separator. Ethylene carbonate (EC), ethyl methyl carbonate (EMC), and diethyl carbonate (DEC) at a volume ratio of 1:1:1 were mixed, and then $LiPF_6$ was sufficiently dissolved in the resulting solution to obtain an electrolyte solution with a concentration of $LiPF_6$ being 1 mol/L. A CR2430 button battery was assembled in a glove box protected under argon. The resulting button battery was left to stand for 12 hours, discharged to 0.005V at a constant current of 0.05 C at 25° C., left to stand for 10 minutes, then discharged to 0.005V at a constant current of 50 µA, left to stand for 10 minutes, then discharged to 0.005V at a constant current of 10 µA; and then charged to 2V at a constant current of 0.1 C, to obtain the charging capacity. A ratio of the charging capacity to the mass of the composite graphite material is the gram capacity of the resulting composite graphite material.

(3) Test of the Fast Charging Performance of the Secondary Battery

At 25° C., the secondary battery was charged to a charge cut-off voltage of 4.4V at a constant current of 0.33 C, then charged to a current of 0.05 C at a constant voltage, left to stand for 5 min, and then discharged to a discharge cut-off voltage of 2.8V at a constant current of 0.33 C, to obtain an actual capacity C0 thereof.

Then, the secondary battery was charged to a full battery charge cut-off voltage of 4.4V or to a negative electrode stopping potential of 0V at a constant current of 0.5C0, 1C0, 1.5C0, 2C0, 2.5C0, 3C0, 3.5C0, 4C0, and 4.5C0 successively (whichever occurred first), should be discharged to a full battery discharge cut-off voltage of 2.8V at 1C0 after the charging was completed each time, to obtain corresponding negative electrode potentials when the secondary battery was charged to 10%, 20%, 30%, . . . , and 80% SOC (State of Charge) at different charging rates, plot rate-negative electrode potential curves in different SOCs, obtain corresponding charging rates when the negative electrode potential was 0V in different SOCs after linear fitting, where the charging rates were charging windows in the SOCs, and were denoted as C10% SOC, C20% SOC, C30% SOC, C40% SOC, C50% SOC, C60% SOC, C70% SOC, and C80% SOC respectively, and compute charging time T (min) of the secondary battery when being charged from 10% SOC to 80% SOC in accordance with an equation (60/C20% SOC+60/C30% SOC+60/C40% SOC+60/C50% SOC+60/C60% SOC+60/C70% SOC+60/C80% SOC)×10%. The shorter the time is, the better the fast charging performance of the secondary battery is.

(4) Test of the Cycle Life of the Secondary Battery

At 25° C., the secondary battery was charged to a charge cut-off voltage of 4.4V at a constant current of 0.33 C, then charged to a current of 0.05 C at a constant voltage, left to stand for 5 min, and then discharged to a discharge cut-off voltage of 2.8V at a constant current of 0.33 C, to obtain an initial capacity C0 thereof. Then, the secondary battery was charged in accordance with the strategy in Table 1, and discharged at 0.33 C, to obtain the discharge capacity Cn of each cycle until the cycling capacity retention rate (i.e., Cn/C0X100%) was 80%, and record the number of cycles. The more the cycles are, the longer the cycle life of the secondary battery is.

TABLE 1

| State of charge (SOC) of secondary battery | Charging rate (C) |
|---|---|
| 0-10% | 0.33 |
| 10%-20% | 5.2 |
| 20%-30% | 4.5 |
| 30%-40% | 4.2 |
| 40%-50% | 3.3 |
| 50%-60% | 2.6 |
| 60%-70% | 2 |
| 70%-80% | 1.5 |
| 80%-100% | 0.33 |

(5) Test of the Low-Temperature Power Performance of the Secondary Battery

At 25° C., the secondary battery was charged to a charge cut-off voltage of 4.4V at a constant current of 0.33 C, then charged to a current of 0.05 C at a constant voltage, left to stand for 5 min, and then discharged to a discharge cut-off voltage of 2.8V at a constant current of 0.33 C, to obtain initial energy P0 thereof. Then, the secondary battery was charged to a charge cut-off voltage of 4.4V at a constant current of 0.33 C, then charged to a current of 0.05 C at a constant voltage, and left to stand for 5 min. The thermostat was adjusted to a temperature of −30° C. The secondary battery was left to stand for 3 h, and then discharged to a discharge cut-off voltage of 2.5V at a constant current of 0.33 C, to obtain the energy P1 in this case. P1/P0 is a discharge energy retention rate of the secondary battery.

Table 2 shows the preparation parameters of the composite graphite material in Examples 1-16 and Comparative Examples 1-2.

Table 3 shows the test results in Examples 1-16 and Comparative Examples 1-2.

TABLE 2

| | Raw materials of bulk particle and characteristic parameters of raw materials | | | | | | | |
|---|---|---|---|---|---|---|---|---|
| | Main raw materials | | Raw materials of kinetic carbon material | | | | Organic | Percentage |
| No. | Type | Dv50 (nm) | Type | $d_{002}$ (nm) | Dv50 (nm) | Binder | carbon source | mass content of binder |
| Example 1 | Raw coke of petroleum non-needle coke | 9.5 | Micro-expanded graphite | 0.33630 | 7.5 | Coal asphalt | Petroleum asphalt | 6% |
| Example 2 | Raw coke of petroleum non-needle coke | 9.5 | Micro-expanded graphite | 0.33630 | 7.5 | Coal asphalt | Petroleum asphalt | 6% |
| Example 3 | Raw coke of petroleum non-needle coke | 9.5 | Micro-expanded graphite | 0.33630 | 7.5 | Coal asphalt | Petroleum asphalt | 6% |
| Example 4 | Raw coke of petroleum non-needle coke | 9.5 | Micro-expanded graphite | 0.33630 | 7.5 | Coal asphalt | Petroleum asphalt | 6% |
| Example 5 | Raw coke of petroleum non-needle coke | 9.5 | Micro-expanded graphite | 0.33630 | 7.5 | Coal asphalt | Petroleum asphalt | 6% |
| Example 6 | Raw coke of petroleum non-needle coke | 9.5 | Micro-expanded graphite | 0.33630 | 7.5 | Coal asphalt | Petroleum asphalt | 6% |
| Example 7 | Raw coke of petroleum non-needle coke | 9.5 | Hard carbon | 0.33615 | 5.3 | Coal asphalt | Petroleum asphalt | 6% |
| Example 8 | Raw coke of petroleum non-needle coke | 9.5 | Expanded graphite | 0.33638 | 7.2 | Coal asphalt | Petroleum asphalt | 6% |
| Example 9 | Raw coke of petroleum non-needle coke | 9.5 | Graphene | 0.33620 | 8.0 | Coal asphalt | Petroleum asphalt | 6% |
| Example 10 | Raw coke of petroleum non-needle coke | 9.5 | Micro-expanded graphite | 0.33630 | 7.5 | Coal asphalt | Petroleum asphalt | 6% |
| Example 11 | Raw coke of petroleum non-needle coke | 9.5 | Micro-expanded graphite | 0.33630 | 7.5 | Coal asphalt | Petroleum asphalt | 6% |
| Example 12 | Raw coke of petroleum non-needle coke | 9.5 | Micro-expanded graphite | 0.33630 | 7.5 | Coal asphalt | Petroleum asphalt | 6% |
| Example 13 | Raw coke of petroleum non-needle coke | 9.5 | Micro-expanded graphite | 0.33630 | 7.5 | Coal asphalt | Petroleum asphalt | 6% |
| Example 14 | Raw coke of petroleum non-needle coke | 9.5 | Micro-expanded graphite | 0.33630 | 7.5 | Coal asphalt | Petroleum asphalt | 6% |
| Example 15 | Raw coke of petroleum non-needle coke | 7 | Micro-expanded graphite | 0.33630 | 6.5 | Coal asphalt | Petroleum asphalt | 6% |
| Example 16 | Raw coke of petroleum non-needle coke | 11.5 | Micro-expanded graphite | 0.33630 | 7.5 | Coal asphalt | Petroleum asphalt | 6% |
| Comparative Example 1 | Raw coke of petroleum non-needle coke | 9.5 | / | / | / | Coal asphalt | / | 6% |

TABLE 2-continued

| | | | | | | | | |
|---|---|---|---|---|---|---|---|---|
| | | | Raw materials of bulk particle and characteristic parameters of raw materials | | | | | |
| | Main raw materials | | Raw materials of kinetic carbon material | | | | Organic | Percentage |
| No. | Type | Dv50 (nm) | Type | $d_{002}$ (nm) | Dv50 (nm) | Binder | carbon source | mass content of binder |
| Comparative Example 2 | Raw coke of petroleum non-needle coke | 9.5 | / | | / | / | Coal asphalt | Petroleum asphalt | 6% |

TABLE 3

| | Composite graphite material | | | | | | Compaction | Performance of secondary battery | | |
|---|---|---|---|---|---|---|---|---|---|---|
| No. | $T_0$ (° C.) | Percentage mass content of kinetic carbon material | Amorphous carbon content | Dv50 (μm) | Powder compaction density (g/cm³) | Gram capacity (mAh/g) | density of negative electrode film layer (g/cm³) | Charging time T(min) | Number of cycles | Discharge energy retention rate (%) |
| Example 1 | 721 | 1% | 3% | 13 | 1.6 | 353.8 | 1.64 | 13.90 | 2056 | 52 |
| Example 2 | 705 | 3% | 3% | 13 | 1.62 | 354.3 | 1.65 | 12.85 | 2387 | 59 |
| Example 3 | 694 | 8% | 3% | 13 | 1.64 | 355.8 | 1.67 | 11.05 | 2622 | 68 |
| Example 4 | 673 | 12% | 3% | 13 | 1.65 | 356.5 | 1.68 | 10.75 | 2406 | 71 |
| Example 5 | 655 | 20% | 3% | 13 | 1.67 | 357.4 | 1.70 | 10.15 | 2164 | 73 |
| Example 6 | 648 | 30% | 3% | 13 | 1.67 | 357.7 | 1.70 | 10.08 | 2094 | 74 |
| Example 7 | 709 | 8% | 3% | 13 | 1.60 | 354.3 | 1.61 | 11.65 | 2032 | 69 |
| Example 8 | 692 | 8% | 3% | 13 | 1.66 | 356.7 | 1.69 | 10.50 | 2715 | 70 |
| Example 9 | 702 | 8% | 3% | 13 | 1.63 | 355.5 | 1.65 | 10.20 | 2680 | 70 |
| Example 10 | 684 | 8% | 3% | 13 | 1.63 | 355.6 | 1.66 | 10.90 | 2731 | 69 |
| Example 11 | 668 | 10% | 3% | 13 | 1.65 | 356.0 | 1.67 | 10.30 | 2685 | 71 |
| Example 12 | 694 | 8% | 3% | 13 | 1.64 | 355.8 | 1.66 | 10.70 | 2543 | 69 |
| Example 13 | 684 | 8% | 3% | 13 | 1.63 | 355.6 | 1.66 | 10.55 | 2577 | 70 |
| Example 14 | 668 | 10% | 3% | 13 | 1.65 | 356.0 | 1.66 | 10.40 | 2481 | 71 |
| Example 15 | 630 | 20% | 3% | 9 | 1.62 | 353.5 | 1.64 | 9.85 | 2257 | 75 |
| Example 16 | 730 | 1% | 3% | 14.5 | 1.63 | 355.3 | 1.66 | 14.77 | 1879 | 48 |
| Comparative Example 1 | 782 | / | / | 11.3 | 1.71 | 355.0 | 1.71 | 21.48 | 136 | 21 |
| Comparative Example 2 | 740 | / | 3% | 12.1 | 1.60 | 353.5 | 1.63 | 16.25 | 672 | 36 |

As can be seen from the test results in Table 3, when the air oxidation temperature $T_0$ of the composite graphite material is from 630° C. to 730° C., the secondary battery can be enabled to not only have a high energy density, but also have significantly improved fast charging performance and low-temperature power performance. In addition, the large rate cycling performance of the secondary battery is also obviously improved.

Figure 10:
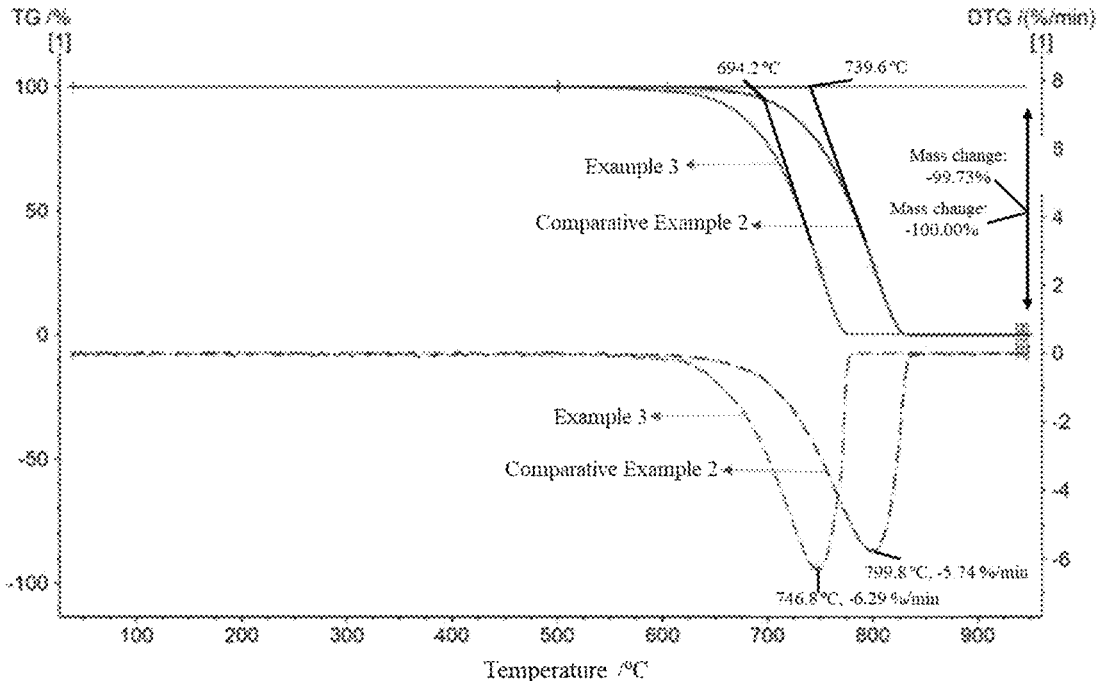
FIG. 10 is a thermogravimetric curve and a differential thermogravimetric curve of a composite graphite material in Example 3 and Comparative Example 2.

FIG. 10 is a thermogravimetric curve and a differential thermogravimetric curve of the composite graphite material in Example 3 and Comparative Example 2. As can be seen from FIG. 10, the composite graphite material in Example 3 has a low air oxidation temperature $T_0$, and comprises an appropriate number of end faces and an appropriate number of defects, such that the secondary battery not only maintains a high energy density, but also has significantly improved fast charging performance and low-temperature power performance.

The composite graphite material in Comparative Example 1 and that in Comparative Example 2 have a high air oxidation temperature $T_0$, comprise a small number of end faces and a small number of defects, and have poor dynamic performance. It is difficult to use the secondary battery under large rate charge-discharge conditions, and the secondary battery also has poor low-temperature power performance.

It should be noted that the present application is not limited to the above embodiments. The above embodiments are merely exemplary, and embodiments having substantially the same technical idea and the same effects within the scope of the technical solutions of the present application are all included in the technical scope of the present application. In addition, without departing from the scope of the subject matter of the present application, various modifications that can be conceived by those skilled in the art are applied to the embodiments, and other modes constructed by combining some of the constituent elements of the embodiments are also included in the scope of the present application.

The invention claimed is:

1. A composite graphite material, comprising a bulk particle and a cladding layer located on at least a partial surface of the bulk particle, and a kinetic carbon material, wherein the bulk particle is a secondary particle formed by aggregation of more than two primary particles, the bulk particle comprises artificial graphite, the kinetic carbon material is located at an interface between the primary particles and/or in the cladding layer, the kinetic carbon material is obtained by graphitization of a raw material selected from one or more of hard carbon micro-expanded graphite, expanded graphite, or graphene, an interlayer distance $d_{002}$ between crystal planes of the raw material (002) of the kinetic carbon material is greater than or equal to 0.3358 nm, and the cladding layer comprises amorphous carbon, wherein, an air oxidation temperature To of the composite graphite material is from 630° C. to 730° C., and the air oxidation temperature To is a temperature corresponding to an intersection of two tangents at two points corresponding to 500° C. and a temperature $T_1$ respectively on a thermogravimetric curve of the composite graphite material, the temperature $T_1$ is a peak temperature of a peak with a largest area in a differential thermogravimetric curve of the composite graphite material, and the thermogravimetric curve and the differential thermogravimetric curve is obtained by thermogravimetric analysis under following conditions: sample mass: 10±0.05 mg, purge gas: air at a gas flow rate of 60 mL/min, heating rate: 5° C./min, and a test temperature ranging from 35° C. to 950° C.

2. The composite graphite material according to claim 1, wherein the interlayer distance $d_{002}$ between crystal planes of the raw material (002) of the kinetic carbon material is from 0.3359 nm to 0.3366 nm.

3. The composite graphite material according to claim 1, wherein the interlayer distance $d_{002}$ between the crystal planes of the composite graphite material (002) is from 0.3355 nm to 0.3364 nm;

a volume average particle size Dv50 of the composite graphite material is from 8.5 μm to 14.5 μm;

a volume average particle size Dv50 of the bulk particle is from 7.5 μm to 13.5 μm; and/or a powder compaction density of the composite graphite material under a force of 20,000N is from 1.45g/cm³ to 1.75g/cm³.

4. The composite graphite material according to claim 1, wherein a ratio of a volume average particle size Dv50 of the primary particles to a volume average particle size Dv50 of the secondary particle formed by the primary particles is from 0.45 to 0.75, and is optionally from 0.55 to 0.65.

5. The composite graphite material according to claim 1, wherein, based on the total mass of the composite graphite material, a percentage mass content of the amorphous carbon in the cladding layer is from 2% to 5%.

6. A negative electrode sheet, comprising a negative electrode current collector and a negative electrode film layer arranged on at least one surface of the negative electrode current collector, wherein the negative electrode film layer comprises the composite graphite material according to claim 1.

7. A secondary battery, comprising the negative electrode sheet according to claim 6.

8. A battery module, comprising the secondary battery according to claim 7.

9. A battery pack, comprising one of the secondary batteries according to claim 7.

10. An electrical apparatus, comprising at least one of the secondary batteries according to claim 7.

11. The composite graphite material according to claim 1, wherein, a percentage mass content of the kinetic carbon material is from 1% to 30%, based on a total mass of the composite graphite material.

12. The composite graphite material according to claim 1, wherein, a percentage mass content of the kinetic carbon material is from 8% to 15%, based on a total mass of the composite graphite material.

13. The composite graphite material according to claim 1, wherein the raw material of the kinetic carbon material is selected from one or more of micro-expanded graphite, expanded graphite, and graphene.

14. The composite graphite material according to claim 13, wherein the raw material of the kinetic carbon material is graphene.

* * * * *